(12) United States Patent
Furuta

(10) Patent No.: US 11,584,183 B2
(45) Date of Patent: Feb. 21, 2023

(54) DAMPING CONTROL APPARATUS AND METHOD FOR A VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 15 days.

(21) Appl. No.: 17/337,771

(22) Filed: Jun. 3, 2021

(65) Prior Publication Data

US 2021/0379955 A1 Dec. 9, 2021

(30) Foreign Application Priority Data

Jun. 4, 2020 (JP) .............................. JP2020-097406

(51) Int. Cl.
*B60G 17/0165* (2006.01)
*H04L 67/12* (2022.01)

(52) U.S. Cl.
CPC .... *B60G 17/0165* (2013.01); *B60G 2400/102* (2013.01); *B60G 2400/202* (2013.01); *B60G 2400/252* (2013.01); *B60G 2500/10* (2013.01); *H04L 67/12* (2013.01)

(58) Field of Classification Search
CPC .......... B60G 17/0165; B60G 2400/102; B60G 2400/202; B60G 2400/252; B60G 2500/10; H04L 67/12
USPC .................................................... 701/37, 38
See application file for complete search history.

(56) References Cited

U.S. PATENT DOCUMENTS

| 11,370,414 | B2 * | 6/2022 | Takei | ..................... | B60W 10/22 |
| 2003/0033063 | A1 * | 2/2003 | Kawashima | ........... | B60G 13/14 |
| | | | | | 701/37 |
| 2010/0324780 | A1 | 12/2010 | Koumura et al. | | |
| 2015/0352920 | A1 | 12/2015 | Lakehal-Ayat et al. | | |
| 2018/0154723 | A1 | 6/2018 | Anderson et al. | | |
| 2019/0168563 | A1 | 6/2019 | Barecke et al. | | |
| 2020/0398630 | A1 * | 12/2020 | Sohn | ..................... | B60W 40/06 |

(Continued)

FOREIGN PATENT DOCUMENTS

| DE | 102016216008 | A1 | 3/2018 |
| EP | 3904134 | A2 | 11/2021 |

(Continued)

*Primary Examiner* — Toan C To
(74) *Attorney, Agent, or Firm* — Dinsmore & Shohl LLP

(57) ABSTRACT

A damping control apparatus has a control unit that controls an active actuator that generates a control force to damp a sprung, and a storage device for storing a unsprung displacement acquired based on a vertical motion state quantity of a vehicle when the vehicle travels, and the control unit determines a predicted wheel passage position where a wheel is predicted to pass, calculates a time derivative value of an unsprung displacement at the predicted wheel passage position acquired by a preview sensor, calculates a target control force based on a sum of a first control component proportional to the time derivative value and a second control component proportional to an unsprung displacement at the predicted wheel passage position acquired from the storage device, and controls a control force generating device so that a control force when the wheel passes the predicted wheel passage position becomes the target control force.

9 Claims, 17 Drawing Sheets

(56) References Cited

U.S. PATENT DOCUMENTS

| | | | |
|---|---|---|---|
| 2021/0370738 A1* | 12/2021 | Furuta | B60G 17/06 |
| 2021/0379953 A1* | 12/2021 | Furuta | B60G 17/0165 |
| 2021/0387498 A1* | 12/2021 | Furuta | B60G 17/0165 |
| 2021/0402840 A1* | 12/2021 | Furuta | B60G 17/0165 |
| 2021/0402841 A1* | 12/2021 | Furuta | B60G 17/0165 |

FOREIGN PATENT DOCUMENTS

| | | |
|---|---|---|
| JP | H05319066 A | 12/1993 |
| JP | 2009-096366 A | 5/2009 |
| JP | 2016-107778 A | 6/2016 |

* cited by examiner

DAMPING CONTROL APPARATUS AND METHOD FOR A VEHICLE

CROSS-REFERENCE TO RELATED APPLICATION

This application claims priority to Japanese Patent Application No. JP2020-097406 filed on Jun. 4, 2020, the content of which is hereby incorporated by reference in its entirety into this application.

BACKGROUND

1. Technical Field

The present disclosure relates to a damping control apparatus and method for a vehicle such as an automobile.

2. Description of the Related Art

In a control of damping a sprung of a vehicle, a control force in the vertical direction generated between a wheel and a vehicle body is controlled in order to dampen the sprung. As a damping control on a sprung of a vehicle, for example, as described in Japanese Patent Application Laid-open No. H05-319066, there is known a preview damping control that damps a sprung at a front wheel position and a rear wheel position by using a vertical road surface displacement in front of a vehicle acquired by a preview sensor. According to the preview damping control, compared to a damping control that detects a vertical motion state quantity of a vehicle such as a vertical acceleration of a sprung and is performed based on the detection result, it is possible to effectively damp the sprung without delay.

Further, as described in U.S. Unexamined Patent Application Publication No. 2018/0154723, for example, as a control for damping a sprung of a vehicle, also known is preview damping control performed based on preview reference data (road surface information acquired in advance) including information on a vehicle position and road surface information. The preview reference data is stored in a server with which the vehicle can communicate wirelessly. The road surface information included in the preview reference data is a value representing a vertical displacement of a road surface (road surface displacement), and is generated based on sensing data acquired by a preview sensor such as a camera sensor, LIDAR, radar, a planar or three-dimensional scanning sensor.

In order to improve accuracy of road surface information included in a preview reference data, it is conceivable to acquire an unsprung displacement in the vertical direction based on a vertical motion state quantity of a vehicle detected when the vehicle is running, and to use a combination of the unsprung displacement and a position where the motion state quantity is detected as a preview reference data. According to the damping control using a preview reference data based on the motion state quantity, it is possible to damp the sprung with higher accuracy than the damping control using a preview reference data based on the sensing by a preview sensor.

Further, in order to effectively damp a sprung, it is conceivable to calculate a target control force for damping the sprung so as to be a sum of a first control component proportional to a time derivative of an unsprung displacement-related value such as a road surface displacement and an unsprung displacement and a second control component proportional to an unsprung displacement-related value.

SUMMARY

An unsprung displacement-related value acquired based on a motion state quantity (referred to as "unsprung displacement-related value based on a motion state quantity") is more accurate than an unsprung displacement-related value acquired based on the sensing by a preview sensor (referred to as "unsprung displacement-related value acquired by a preview sensor"). However, in a high frequency region where an unsprung displacement-related value has a high time change rate, a position of a wheel where the damping control is performed and a position combined with the unsprung displacement-related value based on a motion state quantity are likely to misalign with each other, and the controllability of the damping is reduced.

On the other hand, an unsprung displacement-related value acquired by a preview sensor is unlikely to cause misalignment of positions. However, detection accuracy of a road surface displacement by a preview sensor is lower than detection accuracy of an unsprung displacement-related value based on a motion state quantity. Therefore, even in a region where a time change rate of the unsprung displacement-related value is not high, the accuracy of a damping control using an unsprung displacement-related value acquired by a preview sensor is lower than the accuracy of a damping control using an unsprung displacement-related value based on a motion state quantity.

The present disclosure provides a damping control apparatus which is improved to damp a sprung more accurately than in the past by calculating a target control force based on a combination of two unsprung displacement-related values that take advantage of an unsprung displacement-related value acquired by a preview sensor, an unsprung displacement-related value based on a motion state quantity, and an unsprung displacement-related value based on a unsprung displacement-related information acquired in advance.

According to the present disclosure, a damping control apparatus for a vehicle is provided which comprises a control force generating device configured to generate a vertical control force for damping a sprung of the vehicle between at least one wheel and a vehicle body portion corresponding to a position of the wheel; an electronic control unit configured to control the control force generating device; and a road surface displacement-related information acquisition device configured to acquire road surface displacement-related information related to a vertical displacement of a road surface.

The electronic control unit is configured to determine a predicted wheel passage position where a wheel is predicted to pass, calculate a target control force for reducing a vibration of the sprung when the wheel passes the predicted wheel passage position based on a sum of a first control component based on a first road surface displacement-related value and a second control component based on a time derivative value of a second road surface displacement-related value, and control the control force generating device so that a control force generated by the control force generating device when the wheel passes through the predicted wheel passage position becomes the target control force.

The first and second road surface displacement-related values is a combination of two different road surface displacement-related values among a road surface displacement-related value acquired based on road surface displacement-related information stored in a storage device that stores a road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit that calculates a road surface displacement-related value based on a vertical motion state quantity of the vehicle, and a road surface displacement-related value acquired by a preview sensor that acquires a road surface displacement-related value in front of the vehicle.

The first road surface displacement-related value is a road surface displacement-related value that can be foreseen, and the second road surface displacement-related value has higher accuracy than the first road surface displacement-related value, and the road surface displacement-related information acquisition device includes at least two devices for acquiring the first and second road surface displacement-related values among the calculation unit, the storage device, and the preview sensor.

According to the above configuration, a predicted wheel passage position where a wheel is predicted to pass is determined, and a target control force for reducing a vibration of the sprung when the wheel passes through the predicted wheel passage position is calculated based on a sum of a first control component based on a first road surface displacement-related value and a second control component based on a time derivative value of a second road surface displacement-related value.

The first and second road surface displacement-related values is a combination of two different road surface displacement-related values among a road surface displacement-related value acquired based on road surface displacement-related information stored in a storage device, a road surface displacement-related value calculated by a calculation unit, and a road surface displacement-related value acquired by a preview sensor. The first road surface displacement-related value is a road surface displacement-related value that can be foreseen, and the second road surface displacement-related value has higher accuracy than the first road surface displacement-related value.

Therefore, the first control component can be calculated based on a first road surface displacement-related value that can be foreseen so that the vibration of the sprung can be reduced without delay in control, and compared to where the second control component is calculated based on a first road surface displacement-related value, the second control component capable of damping control with high accuracy can be calculated. In other words, a target control force can be calculated based on a combination of two unsprung displacement-related values that take advantage of an unsprung displacement-related value acquired by the preview sensor, an unsprung displacement-related value based on a motion state quantity, and an unsprung displacement-related value based on unsprung displacement-related information stored in the storage device.

Therefore, according to the above configuration, a target control force is calculated based on a sum of the first and second control components, and it is possible to damp the sprung vibration more accurately compared with the conventional vibration damping control in which the first and second control components are calculated based on the same road surface displacement-related value.

In one aspect of the present disclosure, the combination of the first and second road surface displacement-related values is one of:

a first combination of a first road surface displacement-related value acquired based on the road surface displacement-related information stored in the storage device and a second road surface displacement-related value calculated by the calculation unit, a second combination of a first road surface displacement-related value acquired based on the road surface displacement-related information stored in the storage device and a second road surface displacement-related value acquired by the preview sensor, a third combination of a first road surface displacement-related value acquired by the preview sensor and a second road surface displacement-related value calculated by the calculation unit.

According to the above aspect, the combination of the first and second road surface displacement-related values can be set to any of the first to third combinations. Therefore, it is possible to set the first road surface displacement-related value as a road surface displacement-related value that can be foreseen and set the second road surface displacement-related value as a road surface displacement-related value with higher accuracy than the first road surface displacement-related value.

In another aspect of the present disclosure, the electronic control unit is configured to acquire a sprung vertical acceleration at a position of a front wheel and a relative displacement between the sprung and an unsprung, and calculate a road surface displacement-related value at the position of the front wheel based on the sprung vertical acceleration and the relative displacement.

According to the above aspect, the road surface displacement-related value at a position of the front wheel can be calculated based on the sprung vertical acceleration at the position of the front wheel, which is the motion state quantity of the vehicle in the vertical direction and a relative displacement between the sprung and the unsprung.

Further, in another aspect of the present disclosure, the electronic control unit is configured to acquire a unsprung vertical acceleration at a position of a front wheel and calculate a road surface displacement-related value at the position of the front wheel based on the unsprung vertical acceleration.

According to the above aspect, the road surface displacement-related value at a position of the front wheel can be calculated based on the sprung vertical acceleration at the position of the front wheel which is a vertical motion state quantity of the vehicle.

Further, in another aspect of the present disclosure, the electronic control unit is configured to acquire at least one value of a sprung vertical acceleration at a position of a front wheel, a relative displacement between the sprung and an unsprung at the position of the front wheel, and an unsprung vertical acceleration at the position of the front wheel, and calculate a road surface displacement-related value by an observer based on at least one of the three values.

According to the above aspect, a road surface displacement-related value can be calculated by the observer based on at least one of a sprung vertical acceleration at a position of a front wheel, a relative displacement between the sprung and an unsprung at the position of the front wheel, and an unsprung vertical acceleration at the position of the front wheel.

Further, in another aspect of the present disclosure, the storage device is a storage device provided outside the vehicle, and the electronic control unit is configured to acquire road surface displacement-related information of the predicted wheel passage position from the storage device via a wireless communication line.

According to the above aspect, since the storage device is a storage device provided outside the vehicle, it is possible to eliminate the need to mount a high-capacity storage device on the vehicle.

Further, in another aspect of the present disclosure, the road surface displacement-related information is at least one of an unsprung displacement representing a vertical displacement of the unsprung of the vehicle, an unsprung velocity which is a time derivative of the unsprung displacement, a road surface displacement representing a vertical displacement of a road surface, and a time derivative value of the road surface displacement.

According to the above aspect, a road surface displacement-related value for calculating a target control force can be acquired based on at least one of unsprung displacement, unsprung velocity, road surface displacement, and road surface displacement velocity.

Further, in another aspect of the present disclosure, the road surface displacement-related value is one of a unsprung displacement representing a vertical displacement of an unsprung of the vehicle and a road surface displacement representing a vertical displacement of a road surface.

According to the above aspect, a target control force can be calculated based on either an unsprung displacement or a road surface displacement.

Further, according to the present disclosure, a damping control method for a vehicle is provided which damps a sprung of the vehicle by controlling a control force generating device configured to generate a vertical control force for damping the sprung of the vehicle between at least one wheel and a vehicle body portion corresponding to a position of the wheel, wherein the method comprises:

a step of determining a predicted wheel passage position where the wheel is predicted to pass, a step of calculating a target control force for reducing a vibration of the sprung when the wheel passes through the predicted wheel passage position based on a sum of a first control component proportional to a first road surface displacement-related value and a second control component proportional to a time derivative value of a second road surface displacement-related value, and a step of controlling a control force generating device so that a control force generated by the control force generating device when the wheel passes through the predicted wheel passage position becomes the target control force, the first and second road surface displacement-related values is a combination of two different road surface displacement-related values among a road surface displacement-related value acquired based on road surface displacement-related information stored in a storage device that stores road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit that calculates a road surface displacement-related value based on a vertical motion state quantity of the vehicle, and a road surface displacement-related value acquired by a preview sensor that acquires a road surface displacement-related value in front of the vehicle, the first road surface displacement-related value is a road surface displacement-related value that can be foreseen, and the second road surface displacement-related value has higher accuracy than the first road surface displacement-related value.

According to the above damping control method, the first control component can be calculated based on a first road surface displacement-related value that can be foreseen; the vibration of the sprung can be reduced without delay in control; and the second control component capable of damping control with high accuracy can be calculated compared to where the second control component is calculated based on a first road surface displacement-related value. In other words, a target control force can be calculated based on a combination of two unsprung displacement-related values that take advantage of an unsprung displacement-related value acquired by the preview sensor, an unsprung displacement-related value based on a motion state quantity, and an unsprung displacement-related value based on unsprung displacement-related information stored in the storage device.

Therefore, according to the damping control method, a target control force is calculated based on a sum of the first and second control components, and it is possible to damp the sprung vibration more accurately compared with the conventional vibration damping control in which the first and second control components are calculated based on the same road surface displacement-related value.

In the present application, the "a road surface displacement-related value that can be foreseen" means a road surface displacement-related value that can be acquired before a wheel reach a predicted wheel passage position so that a control force generating device can be controlled so that a control force becomes a target control force when the wheel passes through the predicted wheel passage position. In addition, "with higher accuracy than a first road surface displacement-related value" means at least one of lesser risk of misalignment of positions than the first road surface displacement-related value and better accuracy with respect to an actual road surface displacement-related value than the first road surface displacement-related value.

Other objects, other features and attendant advantages of the present disclosure will be readily understood from the description of the embodiments of the present disclosure described with reference to the following drawings.

DETAILED DESCRIPTION

First Embodiment

<Configuration>

Figure 1:
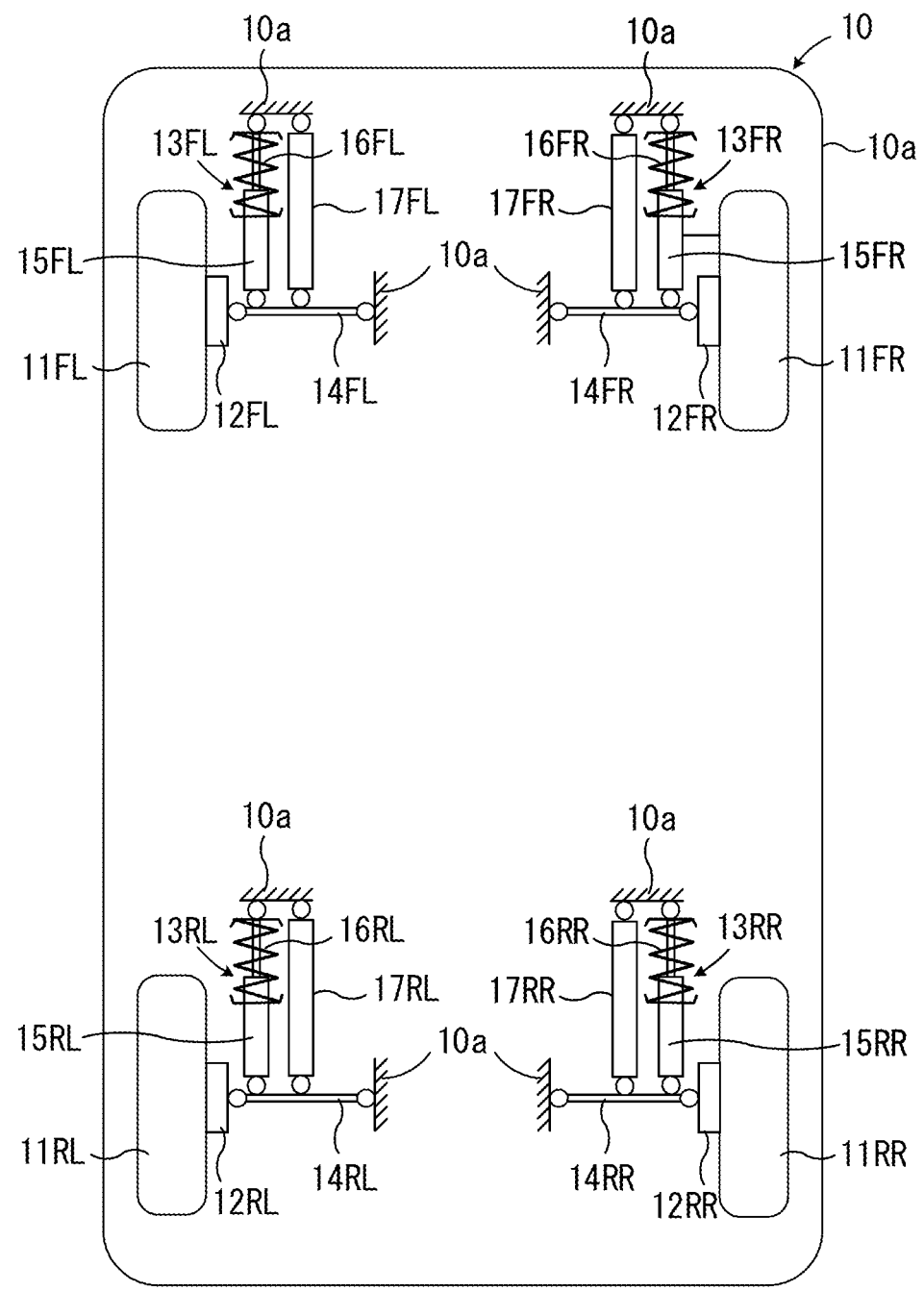
FIG. 1 is a schematic configuration diagram of a vehicle to which the damping control apparatus according to embodiments of the present disclosure is applied.

A preview damping control apparatus 20 for a vehicle according to the first embodiment of the present disclosure is schematically illustrated by reference numeral 20 as a whole in FIG. 2. Hereinafter, the preview damping control apparatus 20 is sometimes simply referred to as a "damping control apparatus 20". The damping control apparatus 20 is applied to (installed in) a vehicle 10 shown in FIG. 1.

The vehicle 10 comprises a front left wheel 11FL, a front right wheel 11FR, a rear left wheel 11RL, and a rear right wheel 11RR. The front left wheel 11FL is rotatably supported by a wheel supporting member 12FL. The front right wheel 11FR is rotatably supported by a wheel supporting member 12FR. The rear left wheel 11RL is rotatably supported by a wheel supporting member 12RL. The rear right wheel 11RR is rotatably supported by a wheel supporting member 12RR.

The front left wheel 11FL, the front right wheel 11FR, the rear left wheel 11RL, and the rear right wheel 11RR are sometimes referred to as "the wheels 11FL-11RR". When the front left wheel 11FL, the front right wheel 11FR, the rear left wheel 11RL, and the rear right wheel 11RR need not be distinguished from each other, each of them is sometimes referred to as a "wheel 11". When the front left wheel 11FL and the front right wheel 11FR need not be distinguished from each other, each of them is sometimes referred to as a "front wheel 11F". When the rear left wheel 11RL and the rear right wheel 11RR need not be distinguished from each other, each of them is sometimes referred to as a "rear wheel 11R". When the wheel supporting members 12FL-12RR need not be distinguished from each other, each of them is sometimes referred to as a "wheel supporting member 12".

The vehicle 10 further comprises a front left suspension 13FL, a front right suspension 13FR, a rear left suspension 13RL, and a rear right suspension 13RR. Details of these suspensions 13FL to 13RR will be described below. In some embodiments, these suspensions 13FL to 13RR are independent suspension type suspensions.

The front left suspension 13FL includes a suspension arm 14FL, a shock absorber 15FL, and a suspension spring 16FL, to suspend the front left wheel 11FL from a vehicle body 10a. The front right suspension 13FR includes a suspension arm 14FR, a shock absorber 15FR, and a suspension spring 16FR, to suspend the front right wheel 11FR from the vehicle body 10a.

The rear left suspension 13RL includes a suspension arm 14RL, a shock absorber 15RL, and a suspension spring 16RL, to suspend the rear left wheel 11RL from the vehicle body 10a. The rear right suspension 13RR includes a suspension arm 14RR, a shock absorber 15RR, and a suspension spring 16RR, to suspend the rear right wheel 11RR from the vehicle body 10a.

The front left suspension 13FL, the front right suspension 13FR, the rear left suspension 13RL, and the rear right suspension 13RR are sometimes referred to as "the suspensions 13FL-13RR". When the front left suspension 13FL, the front right suspension 13FR, the rear left suspension 13RL, and the rear right suspension 13RR need not be distinguished from each other, each of them is sometimes referred to as a "suspension 13". When the suspension arms 14FL-14RR need not be distinguished from each other, each of them is sometimes referred to as a "suspension arm 14". When the shock absorbers 15FL-15RR need not be distinguished from each other, each of them is sometimes referred to as a "shock absorber 15". When the suspension springs 16FL-16RR need not be distinguished from each other, each of them is sometimes referred to as a "suspension spring 16".

The suspension arm 14 connects the wheel supporting member 12 to the vehicle body 10a. It should be noted that, although only one suspension arm 14 is illustrated per one suspension 13 in FIG. 1, a plurality of the suspension arms 14 may be provided per one suspension 13.

The shock absorber 15 is disposed between the vehicle body 10a and the suspension arm 14. An upper end of the shock absorber 15 is connected to the vehicle body 10a. A lower end of the shock absorber 15 is connected to the suspension arm 14. The suspension spring 16 is elastically disposed between the vehicle body 10a and the suspension arm 14 through the shock absorber 15. Namely, an upper end of the suspension spring 16 is connected to the vehicle body 10a. A lower end of the suspension spring 16 is connected to a cylinder of the shock absorber 15. It should be noted that the shock absorber 15 may be disposed between the vehicle body 10a and the wheel supporting member 12 in a case where the suspension spring 16 is elastically disposed in a manner as described.

The shock absorber 15 in this embodiment is an invariable damping force shock absorber, however, the shock absorber 15 may be a variable damping force shock absorber. Furthermore, the suspension spring 16 may be elastically disposed between the vehicle body 10a and the suspension arm 14 without utilizing the shock absorber 15. Namely, the upper end of the suspension spring 16 may be connected to the vehicle body 10a and the lower end of the suspension spring 16 may be connected to the suspension arm 14. When the suspension spring 16 is elastically disposed in this manner, the shock absorber 15 and the suspension spring 16 may be disposed between the vehicle body 10a and the wheel supporting member 12.

Among the members such as the wheel 11 and the shock absorber 15 of the vehicle 10, a portion on the wheel 11 side of the suspension spring 16 is referred to as an "unsprung 50 (see FIG. 3)". On the other hand, among the members such as the vehicle body 10a and the shock absorber 15 of the vehicle 10, a portion on the vehicle body 10a side of the suspension spring 16 is referred to as a "sprung 51 (see FIG. 3)".

A front left wheel active actuator 17FL, a front right wheel active actuator 17FR, a rear left wheel active actuator 17RL, and a rear right wheel active actuator 17RR are provided between the vehicle body 10a and the respective suspension arms 14. These active actuators 17FL to 17RR are provided in parallel with respect to the shock absorbers 15FL to 15RR and the suspension springs 16FL to 16RR, respectively.

When the front left wheel active actuator 17FL, the front right wheel active actuator 17FR, the rear left wheel active actuator 17RL, and the rear right wheel active actuator 17RR need not be distinguished from each other, each of them is referred to as an "active actuator 17". When the front left wheel active actuator 17FL and the front right wheel active actuator 17FR need not be distinguished from each other, each of them is referred to as a "front wheel active actuator 17F". When the rear left wheel active actuator 17RL and the rear right wheel active actuator 17RR need not be distinguished from each other, each of them is referred to as a "rear wheel active actuator 17R".

The active actuator 17 functions as an actuator that variably generates a vertical force (hereinafter referred to as a "control force") Fc that acts between the vehicle body 10a and the associated wheel 11 (between the sprung 51 and the unsprung 50) to damp the unsprung 51 based on a control command from the electronic control unit (hereinafter, referred to as "ECU" and sometimes referred to as "control unit") 30 shown in FIG. 2. The active actuator 17 is sometimes referred to as a "control force generator". In this embodiment, the active actuator 17 is an electromagnetic active actuator. The active actuator 17 cooperates with the shock absorber 15, the suspension spring 16, and the like to form an active suspension.

Figure 2:
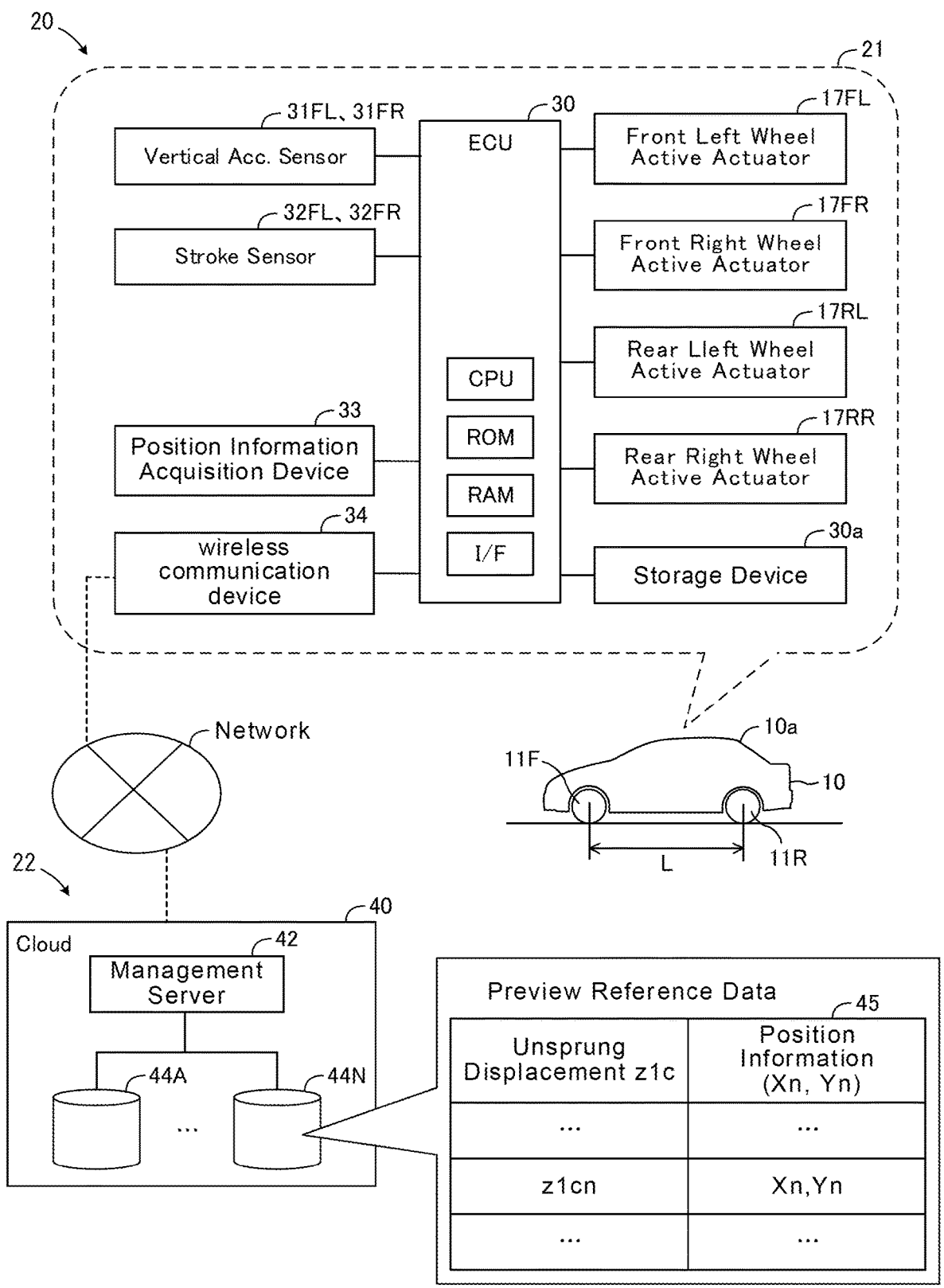
FIG. 2 is a schematic configuration diagram of a damping control apparatus according to the first embodiment of the present disclosure.

In the first embodiment, the damping control apparatus 20 includes an on-board device 21 and an external device 22 as shown in FIG. 2. The on-board device 21 includes an ECU 30, a storage device 30a, a position information acquisition device 33, and a wireless communication device 34. Further, the on-board device 21 includes the above-mentioned active actuators 17FL to 17RR.

The ECU 30 is an electronic control unit that includes a microcomputer. The microcomputer includes a CPU, a ROM, a RAM, and an interface (I/F). The CPU is configured or programmed to realize various functions by executing instructions (or programs, or routines) stored in the ROM.

The ECU 30 is connected with the on-board memory device 30a that is a non-volatile, readable and writable storing device. In the present embodiment, the memory device 30a is a hard disc drive. The ECU 30 is configured to be able to write/store information in the memory device 30a, and read the information stored in the memory device 30a. The memory device 30a is not limited to the hard disc drive, but may be a well-known non-volatile, readable and writable memory device or memory medium.

The on-board device 21 is provided with sprung vertical acceleration sensors 31FL, 31FR and stroke sensors 32FL, 32FR. These vertical acceleration sensors and stroke sensors are on-board sensors and are connected to the ECU 30. As will be described in detail later, the ECU 30 cooperates with these vertical acceleration sensors and stroke sensors to function as a road surface displacement-related information acquisition device that acquires road surface displacement-related information at the positions of the left and right front wheels.

The sprung vertical acceleration sensors 31FL and 31FR are provided on the vehicle body 10a (sprung 51) at the positions corresponding to the left front wheel 11FL and the right front wheel 11FR, respectively. The sprung vertical acceleration sensors 31FL and 31FR detect vertical accelerations (sprung accelerations ddz2fl and ddz2fr) at the corresponding positions of the sprung 51, respectively, and output signals representing the vertical accelerations to the ECU 30. The vertical acceleration sensors 31FL and 31FR are referred to as vertical acceleration sensors 31 when it is not necessary to distinguish them. Similarly, the sprung accelerations ddz2fl and ddz2fr are referred to as a sprung acceleration ddz2.

The stroke sensors 32FL and 32FR are provided on the left front wheel suspension 13FL and the right front wheel suspension 13FR, respectively. The stroke sensors 32FL and 32FR detect vertical strokes Hfl and Hfr of the suspensions 13FL and 13FR, respectively, and output signals representing the vertical strokes to the ECU 30. The strokes Hfl and Hfr are vertical strokes between the vehicle body 10a (prung 51) and the wheel support members 12FL and 12FR (unsprung 50) corresponding to the positions of the left front wheel 11FL and the right front wheel 11FR, respectively. The stroke sensors 32FL and 32FR are referred to as stroke sensors 32 when it is not necessary to distinguish them. Similarly, strokes Hfl and Hfr are referred to as a "stroke H".

Further, the ECU 30 is connected to the position information acquisition device 33 and the wireless communication device 34.

The position information acquisition device 33 includes a GNSS (Global Navigation Satellite System) receiver and a map database. The GNSS receiver receives a signal from an artificial satellite (for example, a GNSS signal) for detecting a present time position (present position) of the vehicle 10. Road map information and the like are stored in the map database. The position information acquisition device 33 is a device that acquires the present position (for example, latitude and longitude) of the vehicle 10 based on the GNSS signal, and is, for example, a navigation device.

The ECU 30 acquires a vehicle speed V1 of the vehicle 10 and a traveling direction Td of the vehicle 10 at the present time based on the history of the present position acquired by the position information acquisition device 33.

The wireless communication device 34 is a wireless communication terminal for communicating information with a cloud 40 of the external device 22 via a network. The cloud 40 includes a management server 42 and a plurality of storage devices 44A to 44N and they are connected to the network. One or more storage devices 44A to 44N are referred to as storage devices 44 when it is not necessary to distinguish them. The storage device 44 functions as a storage device outside the vehicle of the damping control apparatus 20.

The management server 42 includes a CPU, ROM, RAM, an interface (I/F), and the like. The management server 42 searches and reads a data stored in the storage device 44, and writes a data in the storage device 44.

A preview reference data 45 is stored in the storage device 44. In the preview reference data 45, an unsprung displacement z1 acquired based on vertical motion state quantities of the vehicle 10 or other vehicles detected when the vehicle or the other vehicles actually travels on a road surface is registered in association with an information on the position where the vertical motion state quantities are detected. Therefore, the preview reference data 45 is data that is a combination of the unsprung displacement z1 acquired based on vertical motion state quantities of the vehicle or the other vehicles and an information of the position where the vertical motion state quantities are detected.

The unsprung 50 is displaced in the vertical direction in response to a displacement of a road surface when the vehicle 10 travels on the road surface. The unsprung displacement z1 is the vertical displacement of the unsprung 50 corresponding to the position of each wheel 11 of the vehicle 10. The position information is information representing a position (for example, latitude and longitude) of the wheel 11 from which the unsprung displacement z1 was acquired at the time when the unsprung displacement z1 was acquired. In FIG. 2, as an example of the unsprung displacement z1c and the position information registered in association with the preview reference data 45, the unsprung displacement z1cn and the position information (Xn, Yn) (n=1, 2, 3, . . . ) are illustrated.

Further, the ECU 30 is connected to the left front wheel active actuator 17FL, the right front wheel active actuator 17FR, the left rear wheel active actuator 17RL, and the right rear wheel active actuator 17RR via drive circuits (not shown).

The ECU 30 calculates a target control force Fct for damping the sprung 51 of each wheel 11 based on the unsprung displacement z1 of a predicted passage position described later of each wheel 11, and controls the active actuator 17 so that a control force Fc generated by the active actuator 17 when each wheel 11 passes through the predicted passage position becomes the target control force Fct.

<Outline of Preview Damping Control>

Figure 3:
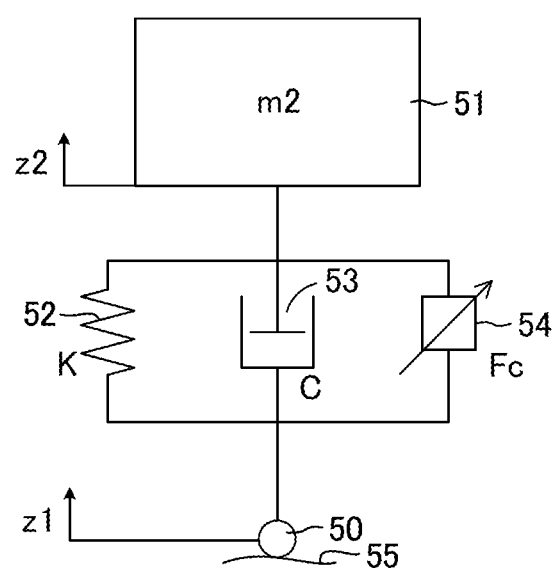
FIG. 3 is a diagram showing a single-wheel model of a vehicle.

An outline of the basic preview damping control performed by the damping control apparatus 20 will next be described. FIG. 3 illustrates a single wheel model of the vehicle 10.

A spring 52 corresponds to the suspension spring 16. A damper 53 corresponds to the shock absorber 15. An actuator 54 corresponds to the active actuator 17.

In FIG. 3, a mass of the sprung 51 is represented as a sprung mass m2. A vertical displacement of the unsprung 50 described above is represented as an unsprung displacement z1. Further, a vertical displacement of the sprung 51 is expressed as a sprung displacement z2, and the sprung displacement z2 is a vertical displacement of the sprung 51 corresponding to the position of each wheel 11. A spring constant (equivalent spring constant) of the spring 52 is expressed as a spring constant K. A damping coefficient (equivalent damping coefficient) of the damper 53 is expressed as a damping coefficient C. A force generated by the actuator 54 is referred to as a control force Fc.

Time derivative values of z1 and z2 are represented as dz1 and dz2, respectively. Second order time derivative values of z1 and z2 are represented as ddz1 and ddz2, respectively. The values of z1 and z2 become positive when the respective parts move upward. The forces generated by the spring 52, the damper 53, and the actuator 54 have positive signs when direction of the forces generated by them is upward.

In the single wheel model shown in FIG. 3, a motion equation regarding a vertical direction movement of the sprung mass 51 is expressed as the following equation (1).

$$m2 \cdot ddz2 = C \cdot (dz1 - dz2) + K \cdot (z1 - z2) - Fc \qquad (1)$$

It is assumed that the damping coefficient C in the equation (1) is constant. However, since an actual damping coefficient changes according to a stroke speed of the suspension 13, for example, it may be variably set according to the time derivative value of the stroke H.

When the vibration is completely cancelled (eliminated) by the control force Fc (in other words, when the acceleration ddz2, the rate dz2, and the displacement z2, of the sprung mass 51 are made to be zero), the control force Fc is expressed as the following equation (2).

$$Fc = C \cdot dz1 + K \cdot z1 \qquad (2)$$

Therefore, the control force Fc that reduces the vibration of the sprung 51 can be expressed by the following equation (3) with a control gain as $\alpha$. The control gain $\alpha$ is an arbitrary constant greater than 0 and less than or equal to 1.

$$Fc = \alpha \cdot (C \cdot dz1 + K \cdot z1) \qquad (3)$$

By applying the equation (3) to the equation (1), the equation (1) can be expressed as the following equation (4).

$$m2 \cdot ddz2 = C \cdot (dz1 - dz2) + K \cdot (z1 - z2) - \alpha \cdot (C \cdot dz1 + K \cdot z1) \qquad (4)$$

When a Laplace transform is performed for the equation (4), and then the result is deformed, the equation (4) can be expressed as the following equation (5). In the equation (5), "s" represents a Laplace operator.

$$\frac{z_2}{z_1} = \frac{(1-\alpha)(Cs+K)}{m_2 s^2 + Cs + K} \qquad (5)$$

As understood from the equation (5), a magnitude of the transfer function varies depending on $\alpha$, and becomes minimum when $\alpha$ is equal to 1. Therefore, the target control force Fct can be expressed by the following equation (6) corresponding to the equation (3). A gain $\beta 1$ in the equation (6) corresponds to $\alpha Cs$, and a gain $\beta 2$ corresponds to $\alpha K$.

$$Fct = \beta 1 \cdot dz1 + \beta 2 \cdot z1 \qquad (6)$$

Therefore, the ECU 30 acquires in advance (previews) an unsprung displacement z1 at a position where the wheel 11 passes through later (predicted passage position), and applies the acquired unsprung displacement z1 to the equation (6) to calculate a target control force Fct. Then, the ECU 30 make the actuator 54 generate a control force Fc corresponding to the target control force Fct at a timing when the wheel 11 passes through the predicted passage position (that is, at a timing when the unrsprung displacement z1 applied to the equation (6) occurs). In this way, it is possible to reduce a vibration of the sprung 51 that occurs when the wheel 11 passes through the predicted passage position (that is, when the unsprung displacement z1 applied to the equation (6) occurs).

The above is the damping control of the sprung 51, and such damping control of the sprung 51 is called the preview damping control.

It should be noted that, in the above single wheel model, a mass of the unsprung 50 and an elastic deformation of a tire are ignored so that a road surface vertical displacement z0 is deemed to be substantially the same as the unsprung displacement z1. Therefore, the preview damping control can be carried out using a vertical displacement z0 of a road surface in place of the unsprung displacement z1.

(Preview Damping Control of Front and Rear Wheels)

Next, with reference to FIGS. 4 to 6, the preview damping control of the front wheels and the rear wheels common to the embodiments will be described.

Figure 4:
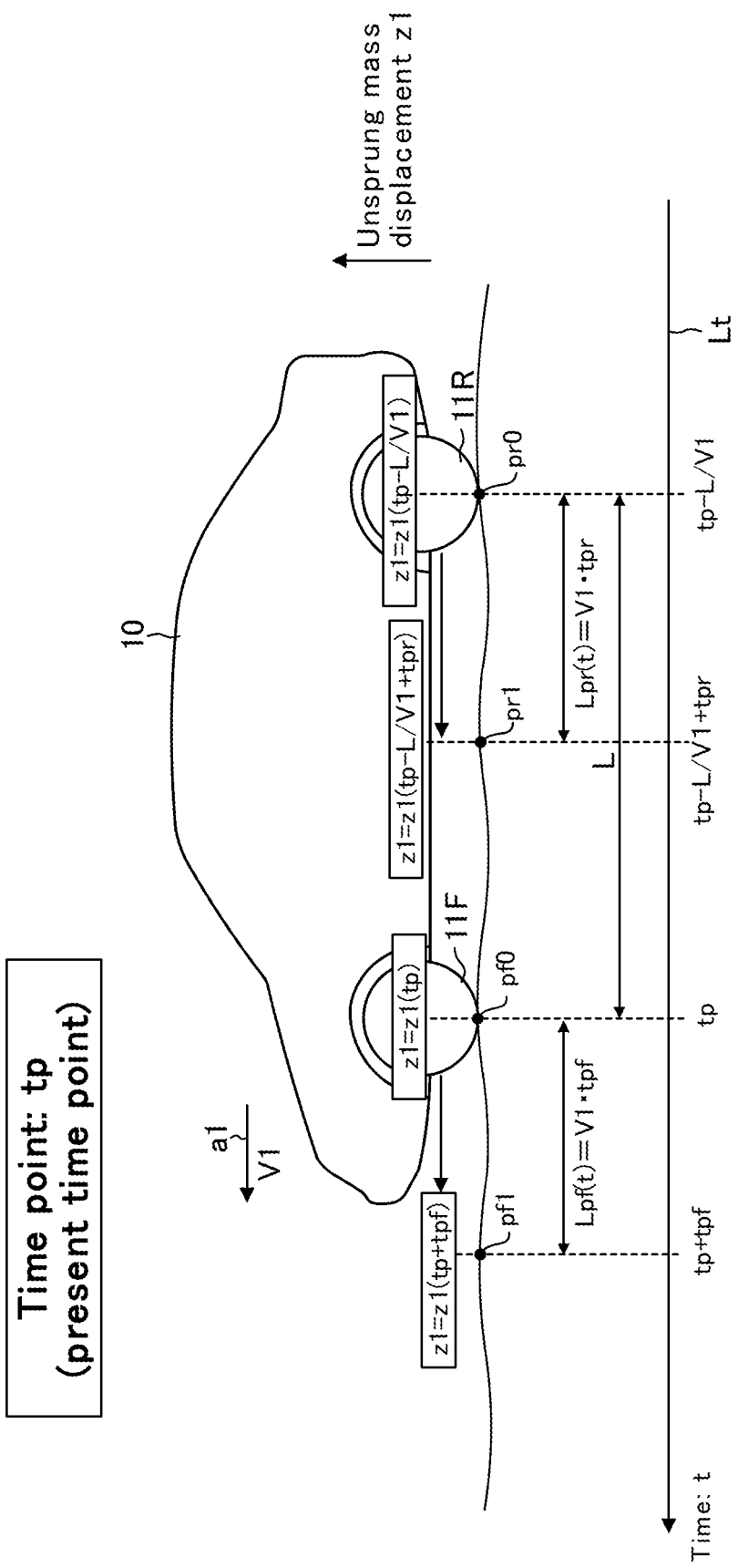
FIG. 4 is a diagram for explaining preview damping control.

FIG. 4 shows the vehicle 10 traveling at a vehicle speed V1 in a direction indicated by the arrow a1 at the present time tp. In the following description, the front wheel 11F and the rear wheel 11R are considered to be wheels on the same side, and moving speeds of the front wheel 11F and the rear wheel 11R are considered to be the same as the vehicle speed V1.

In FIG. 4, a line Lt is a virtual time axis. The unsprung displacement z1 of the front wheel 11F on a movement route of the front wheel 11F is expressed as a function z1 (t), wherein t is a time. The time t can represent a present time point, a time point in the past, and a time point in the future. Accordingly, the unsprung displacement z1 of the front wheel 11F at a position (tire-ground contact point) pf0 at the present time point tp is expressed as z1(tp). Further, the unsprung displacement z1 of the position pr0 of the rear wheel 11R at the present time tp is the unsprung displacement z1 of the front wheel 11F at the time "tp−L/V1" that is before the present time tp by a time (L/V1) required for the front wheel 11F to move a wheelbase length L. Therefore, the unsprung displacement z1 of the rear wheel 11R at the present time tp is expressed as z1 (tp−L/V1).

<Preview Damping Control of the Front Wheel 11F>

The ECU 30 specifies (predicts) a predicted passage position pf1 of the front wheel 11F at a time point (in the future) a front wheel foresee time tpf from the present time tp. The front wheel foresee time tpf is set in advance as a time required for the front wheel active actuator 17F to output a control force Fcf corresponding to a target control force Fcft after the ECU 30 specifies the predicted passage position pf1.

The predicted passage position pf1 of the front wheel 11F is a position spaced from the position pf0 at the present time tp by a front wheel foresee distance Lpf (=V1×tpf) along a predicted front wheel movement course, which is a course where the front wheel 11F is predicted to move in the future. As will be described in detail later, the position pf0 is calculated based on a present position of the vehicle 10 acquired by the position information acquisition device 33.

When the predicted passage position pf1 of front wheel is specified, the ECU 30 acquires the unsprung displacement of the predicted passage position pf1 as the unsprung displacement z1(tp+tpf). Further, the ECU 30 calculates a time derivative value dz1 (tp+tpf) of the unsprung displacement z1 (tp+tpf). Since the acquisition of the unsprung displacement of the front wheel and the time derivative value of the unsprung displacement of the predicted passage position of the front wheel differs depending on the embodiments, procedures for acquiring these will be described later.

The ECU 30 calculates a target control force Fcft of the front wheel by applying the unsprung displacement z1(tp+tpf) and the time differential value dz1(tp+tpf) to the following equation (7) corresponding to the above equation (6).

$$Fcft = \beta_1 f \times z1 + \beta_2 f \times z1 \quad (7)$$

Further, the ECU 30 transmits a control command including the target control force Fcft to the front wheel active actuator 17F so that the front wheel active actuator 17F generates a control force Fcf corresponding to the target control force Fcft.

Figure 5:
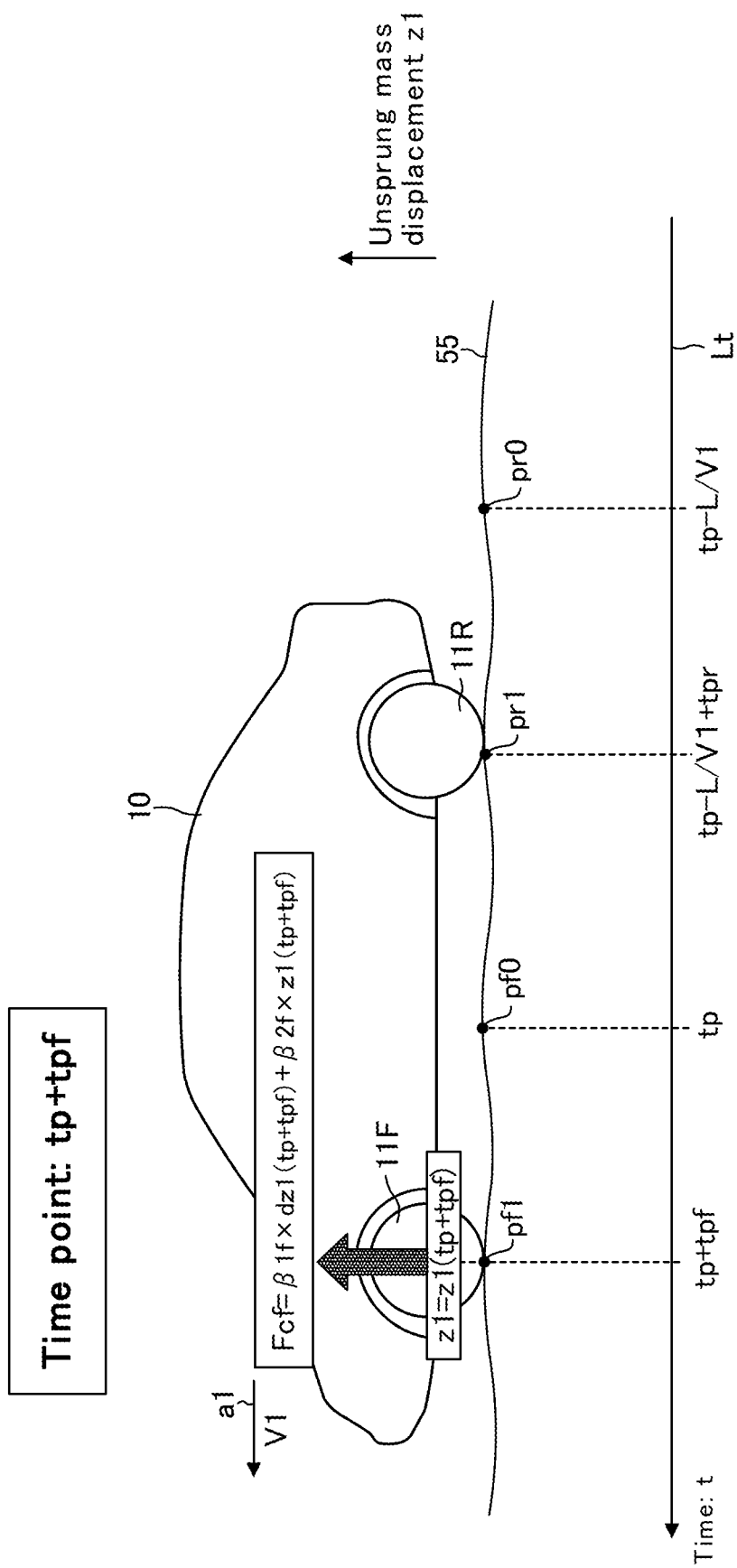
FIG. 5 is a diagram for explaining preview vibration damping control.

As shown in FIG. 5, the front wheel active actuator 17F generates a control force Fcf corresponding to the target control force Fcft at a time tp+tpf after the front wheel foresee time tpf from the present time tp (that is, at a timing when the front wheel 11F actually passes through the predicted passage position pf1). Therefore, the front wheel active actuator 17F generates a control force Fcf at an appropriate timing to absorb an excitation force generated due to the unsprung displacement z1 of the predicted passage position pf1 of the front wheel 11F, and can appropriately reduce the vibration of the sprung 51.

<Preview Damping Control of Rear Wheel 11R>

The ECU 30 specifies a predicted passage position pr1 of the rear wheel 11R at a time point after the rear wheel foresee time tpr from the present time tp (in the future). The rear wheel foresee time tpr is set in advance as a time required for the rear wheel active actuator 17R to output a control force Fcr corresponding to the target control force Fcrt after the ECU 30 identifies the predicted passage position pr1.

When the front wheel active actuator 17F and the rear wheel active actuator 17R are different active actuators, the front wheel foresee time tpf and the rear wheel foresee time tpr are set to different values in advance. When the front wheel active actuator 17F and the rear wheel active actuator 17R are the same active actuator, the front wheel foresee time tpf and the rear wheel foresee time tpr are preset to the same values.

The ECU 30 specifies a position spaced from a position pf0 at the present time tp by a rear wheel foresee distance Lpr (=V1×tpr) along a predicted movement course of the rear wheel 11R assuming that the rear wheel 11R follows the same course as the front wheel 11F as the predicted passage position pr1. The unsprung displacement z1 of the predicted passage position pr1 is the unsprung displacement z1 at a time point (tp−L/V1+tpr) after the rear wheel foresee time tpr from the time (tp−L/V1) when the front wheel 11F was located at the position pr0 of the rear wheel 11R at the present time.

Therefore, the ECU 30 acquires an unsprung displacement of the predicted rear wheel passage position pr1 as the unsprung displacement z1 (tp−L/V1+tpr). Further, the ECU 30 calculates a time derivative value dz1(tp−L/V1+tpr) of the unsprung displacement z1 (tp−L/V1+tpr). Since the acquisition of the unsprung displacement of the predicted rear wheel passage position and the time derivative value of the unsprung displacement differs depending on the embodiments, procedures for acquiring these will also be described later.

The ECU 30 is used to calculate a target control force Fcrt for the rear wheel by applying the unsprung displacement z1(tp−L/V1+tpr) and the time differential value dz1 (tp−L/V1+tpr) to the following equation (8) corresponding to the above equation (6).

$$Fcrt = \beta_1 r \times dz1 + \beta_2 r \times z1 \quad (8)$$

Further, the ECU 30 transmits a control command including the target control force Fcrt to the rear wheel active actuator 17R so that the rear wheel active actuator 17R generates a control force Fcr corresponding to the target control force Fcrt.

Figure 6:
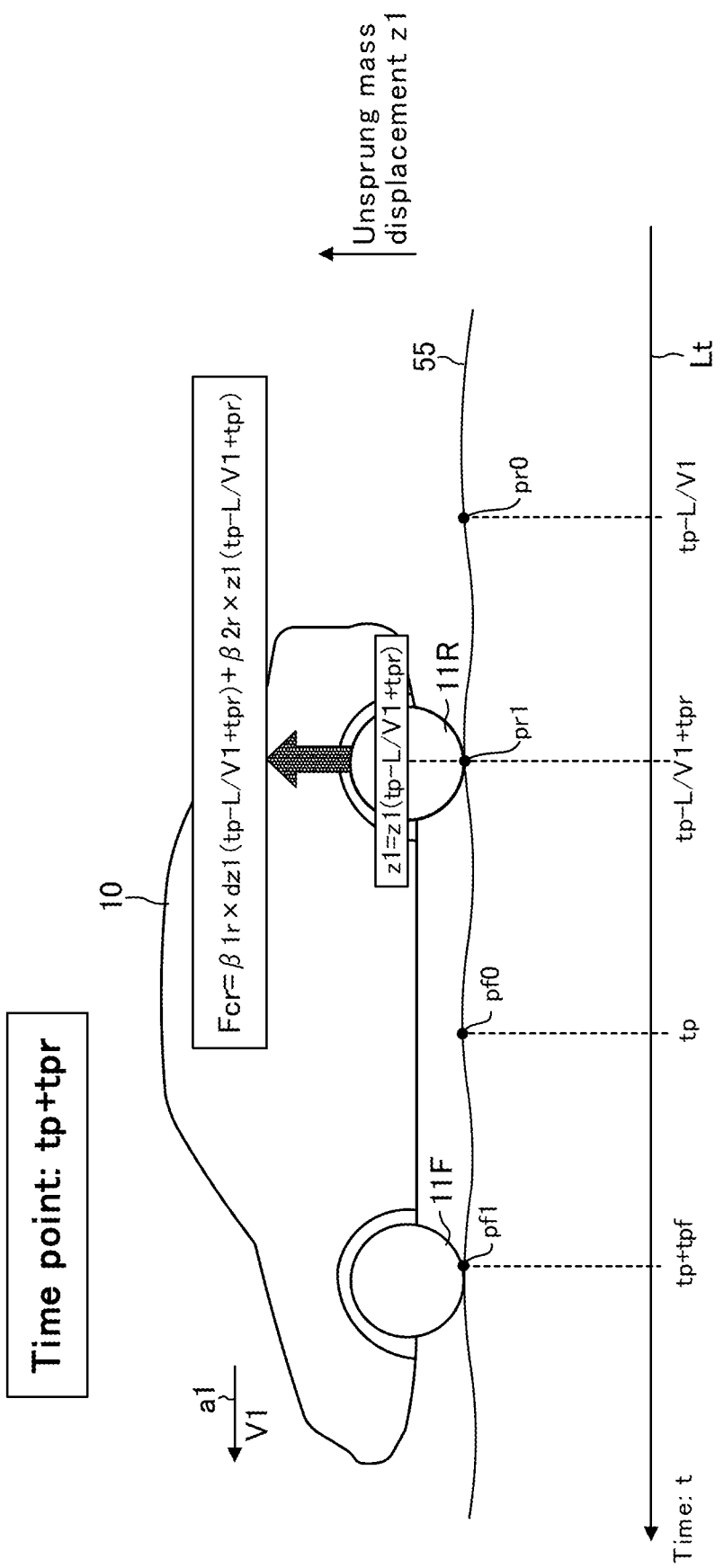
FIG. 6 is a diagram for explaining preview vibration damping control.

As shown in FIG. 6, the rear wheel active actuator 17R generates a control force Fcr corresponding to the target control force Fcrt at a time tp+tpr that is after the rear wheel foresee time tpr from the present time tp. Therefore, the rear wheel active actuator 17R generates a control force Fcr at an appropriate timing to absorb an excitation force generated due to the unsprung displacement z1 of the predicted passage position pr1 of the rear wheel 11R, and can appropriately reduce the vibration of the sprung 51.

(Outline of Operation)

Hereinafter, the outline of the operation of the damping control apparatus 20 of the first embodiment will be described.

The position information acquisition device 33 functions as a vehicle information acquisition device that acquires information on the position of the vehicle. The ECU 30 acquires information about the present position of the vehicle 10 from the position information acquisition device 33, and specifies the present position of each wheel 11, the vehicle speed V1, and the traveling direction Td of the vehicle 10.

As will be described in detail later, the ECU 30 determines a predicted wheel passage position where each wheel is predicted to pass based on the present position of each wheel 11, the vehicle speed V1, and the traveling direction Td of the vehicle 10, and acquires the unsprung displacement z1ci (i=fl, fr, rl and rr) of a predicted passage position of each wheel from the unsprung displacement z1ci acquired from the cloud 40. Notably, fl, fr, rl and rr mean the left front wheel, the right front wheel, the left rear wheel and the right rear wheel, respectively.

As will be described in detail later, the ECU 30 calculates the unsprung displacements z1sfl and z1sfrr at the predicted passage positions of the left and right front wheels and the unsprung displacements z1srl and z1srr at the predicted passage positions of the left and right rear wheels based on sprung accelerations ddz2fl, ddz2fr and strokes Hfl and Hfr. The ECU 30 calculates a time derivative values dz1si (i=fl, fr, rl and rr) of the unsprung displacement z1si based on the unsprung displacement z1si. The ECU 30 calculates a target control force Fcit for damping the sprung at the positions of the left and right front wheels and the left and right rear wheels, respectively, according to the following equations (9) and (10) corresponding to the above equation (6). The target control forces Fcit (i=fl, fr) of the left and right front wheels are sums of the first control component β2f×z1ci proportional to the unsprung displacement z1ci and the second control component β1f×dz1si proportional to the time derivative values dz1si. The target control forces Fcit (i=rl, rr) of the left and right rear wheels are sums of the first control component β2r×z1ci proportional to the unsprung displacement z1ci and the second control component β1r× dz1si proportional to the time derivative values dz1si.

$$Fcit = \beta 1f \times dz1i + \beta 2f \times z1i \quad (9)$$

$$Fcit = \beta 1r \times dz1i + \beta 2r \times z1i \quad (10)$$

The gains β1f and β2f and the gains β1r and β2r in the equations (9) and (10) are expressed as different values from each other in the equations. This is because it is considered that the damping coefficients Cf and Cr of the shock absorbers of the front wheels and the rear wheels may be different from each other, and the spring constants Kf and Kr of the suspensions of the front wheels and the rear wheels may be different from each other.

Further, the ECU 30 controls each active actuator 17 so that each active actuator 17 outputs a control force Fci corresponding to the target control force Fcit at the timing when each wheel 11 passes through the corresponding predicted passage position.

(Preview Damping Control Routine of the First Embodiment)

Figure 7:
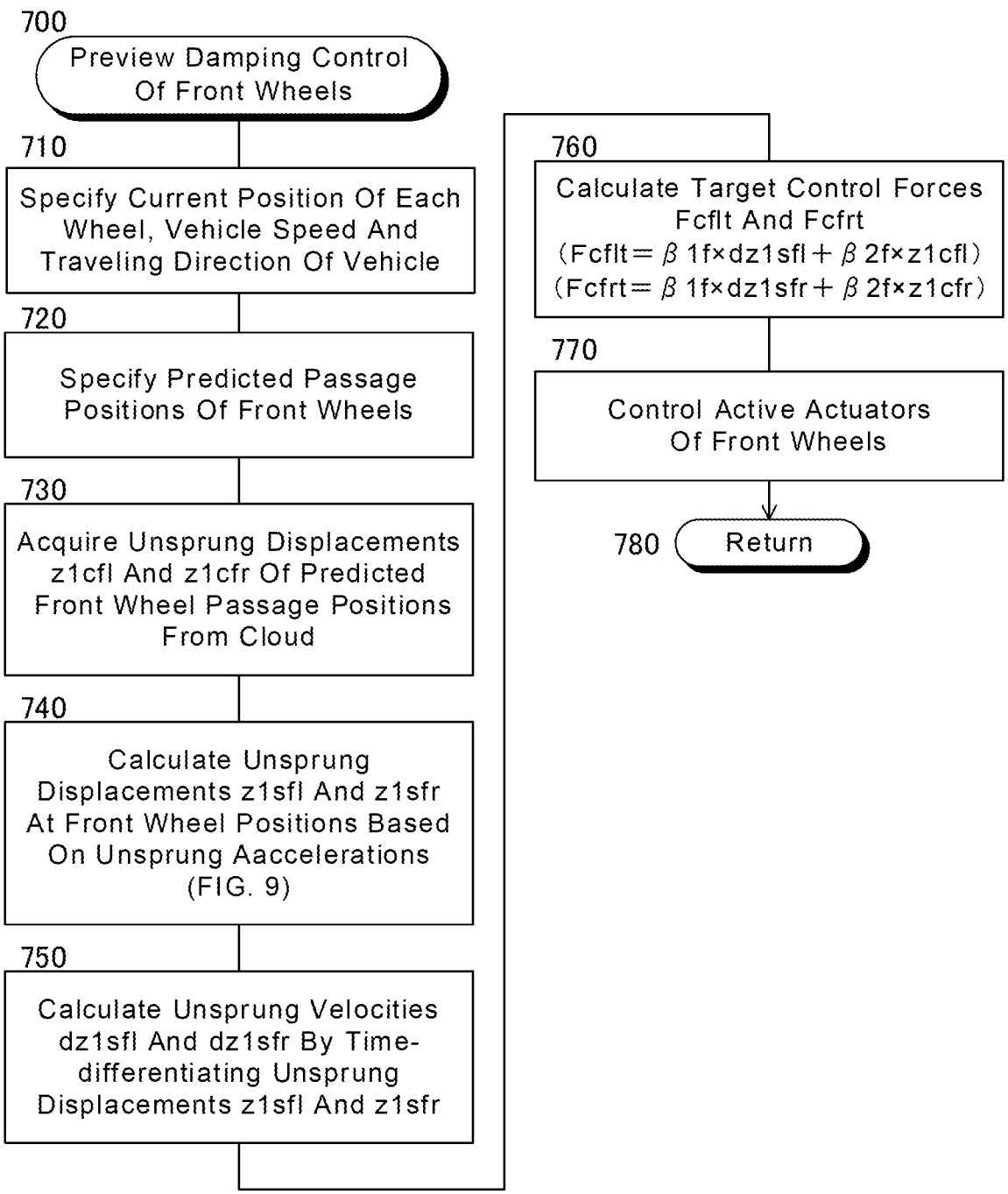
FIG. 7 is a flowchart showing a preview damping control routine for front wheels in the first embodiment.
Figure 8:
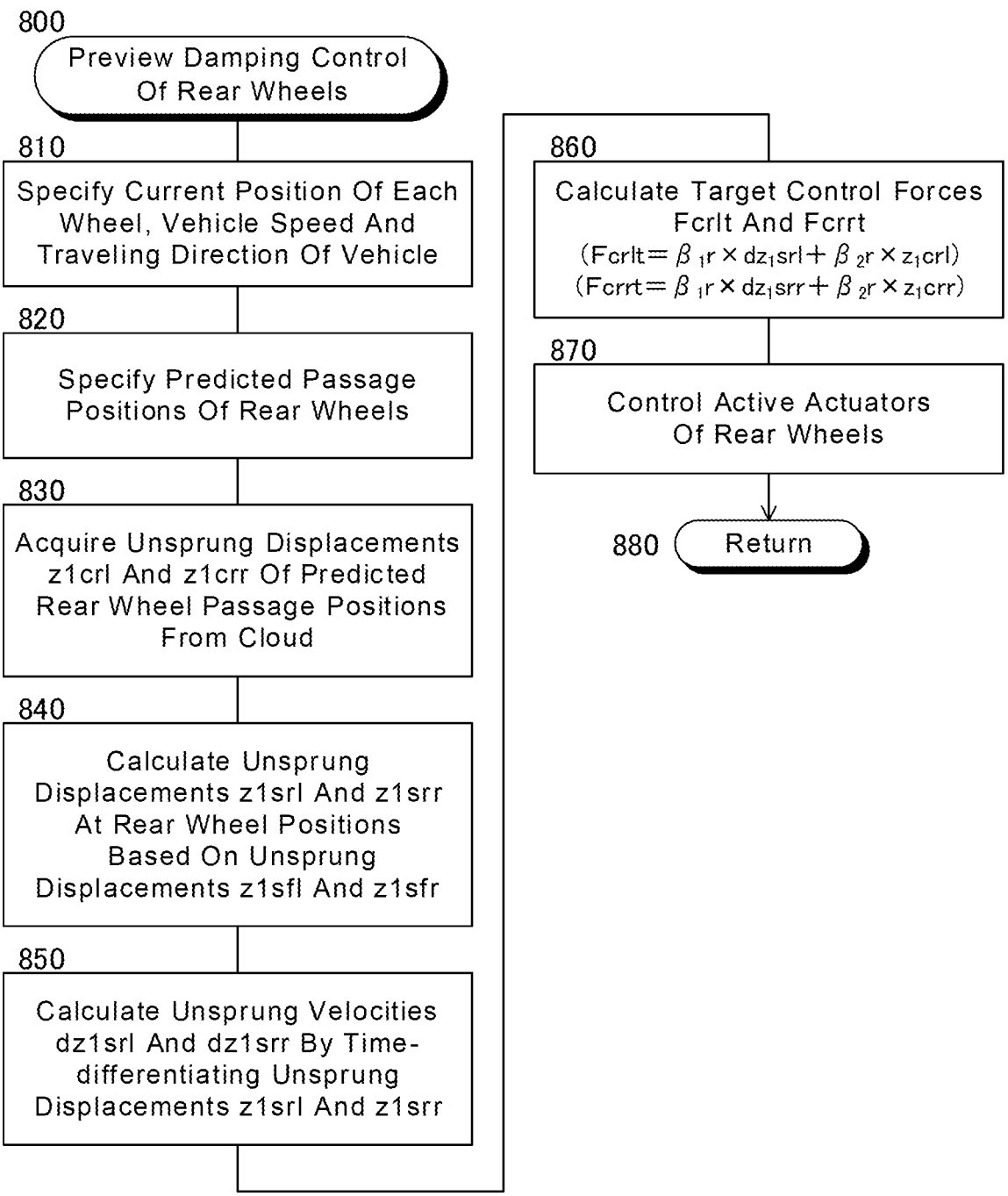
FIG. 8 is a flowchart showing a preview damping control routine for rear wheels in the first embodiment.

The CPU of the ECU 30 executes the preview damping control routine shown in the flowcharts of FIGS. 7 and 8 in the order of, for example, the left front wheel, the right front wheel, the left rear wheel, and the right rear wheel every time a predetermined time elapses. The CPU refers to the CPU of the ECU 30 unless otherwise specified.

<Preview Damping Control of Front Wheels 11FL and 11FR>

At a predetermined timing, for example, the CPU starts processing from step 700 in FIG. 7 in the order of the left front wheel and the right front wheel to execute steps 710 to 770, and then proceeds to step 780 to temporarily end this routine.

Step 710: The CPU acquires information about the present position of the vehicle 10 from the position information acquisition device 33, and specifies (acquires) a present position of each wheel 11, a vehicle speed V1, and a traveling direction Td of the vehicle 10.

More specifically, the CPU maps a previous cycle present position and a present cycle present position to the road map information included in the map database, and specifies a direction from the previous cycle present position to the present cycle present position as a traveling direction Td of the vehicle 10. The previous cycle present position means the present position of the vehicle 10 acquired by the CPU in step 710 of this routine executed last time. Further, the present cycle present position means the present position of the vehicle 10 acquired by the CPU in step 710 this time.

In the ROM of the ECU 30, positional relationship data representing the relationship between a mounting position of the GNSS receiver in the vehicle 10 and a position of each wheel 11 is stored in advance. Since the present position of the vehicle 10 acquired from the position information acquisition device 33 corresponds to the mounting position of the GNSS receiver, the CPU identifies the present position of each wheel 11 by referring to the present position of the vehicle 10, the traveling direction Td of the vehicle 10, and the positional relationship data.

Further, the GNSS signal received by the position information acquisition device 33 includes information on a moving speed, and the CPU identifies a vehicle speed V1 based on the GNSS signal.

Step 720: The CPU specifies predicted passage positions of the front wheels as described below.

Based on the present position of each wheel 11, the traveling direction Td of the vehicle 10, and the positional relationship data, the CPU specifies courses on which the left and right front wheels 11FL and 11FR are predicted to move when the vehicle 10 travels along the traveling direction Td as predicted movement courses of the left and right front wheels.

The predicted movement courses of the left and right rear wheels include the first predicted courses from the present positions of the left and right rear wheels 11RL and 11RR to the present positions of the front wheels 11FL and 11FR, respectively and the second predicted courses on the traveling direction side of the vehicle 10 with respect to the present positions of the front wheels 11FL and 11FR. Therefore, the CPU specifies routes in which the left and right front wheels 11FL and 11FR actually moved from the present positions of the rear wheels 11RL and 11RR to the present positions of the left and right front wheels as the first predicted courses. Further, the CPU specifies predicted movement courses of the left and right front wheels as the second predicted courses of the left and right rear wheels 11RL and 11RR, respectively.

As described above, the CPU calculates a front wheel foresee distance Lpf by multiplying a vehicle speed V1 by the front wheel foresee time tpf, and calculates a rear wheel foresee d distance Lpr by multiplying the vehicle speed V1 by the rear wheel foresee time tpr. Further, the CPU specifies a predicted passage position pfl of the front wheel and a predicted passage position pr1 of the rear wheel.

More specifically, the CPU specifies the positions where the left and right front wheels 11FL and 11FR advance from their present positions by the front wheel foresee distance Lpf along predicted movement courses of the left and right front wheels as predicted passage positions pfl1 and pfr1 of the left and right front wheels. Further, the CPU identifies the positions where the left and right rear wheels 11RL and 11RR advance from their present positions by the rear wheel foresee distance Lpr along the predicted movement courses of left and right rear wheels as predicted passage positions prl1 and prr1 of the left and right rear wheels.

Step 730: The CPU acquires information on the unsprung displacements z1cfl and z1cfr at the front wheel passage positions from the unsprung displacements in a preparation section acquired in advance from the preview reference data 45 of the cloud 40.

The preparation section is a section that starts at a predicted passage position pfl of the front wheel when an end point of the preparation section is reached, and ends at a position spaced from this predicted front wheel passage position pfl by a predetermined preparation distance along the predicted movement course of the front wheel. Further, the preparation distance is predetermined to be a value that is sufficiently larger than the front wheel foresee distance Lpf.

Step 740: The CPU calculates unsprung displacements z1sfl and z1sfr at the front wheel positions based on sprung accelerations ddz2fl and ddz2fr by executing steps 910 to 950 in FIG. 9, and proceeds to step 750 when step 950 is completed.

Step 750: The CPU calculates unsprung velocities dz1sfl and dz1sfr by time-differentiating the unsprung displacements z1sfl and z1sfr, respectively.

Step 760: Based on the unsprung velocities dz1sfl, dz1sfr and the unsprung displacements z1cfl, z1cfr, the CPU uses the following equations (11) and (12) corresponding to the above equation (9) to calculate target control forces Fcflt and Fcfrt of the active actuators 17FL and 17FR of the left and right front wheels, respectively.

$$Fcflt = \beta 1f \times dz1sfl + \beta 2f \times z1cfl \tag{11}$$

$$Fcfrt = \beta 1f \times dz1sfr + \beta 2f \times z1cfr \tag{12}$$

Step 770: The CPU transmits control commands including the target control forces Fcflt and Fcfrt to the active actuators 17FL and 17FR of the left and right front wheels, respectively.

<Preview Damping Control of Rear Wheels 11RL and 11RR>

At a predetermined timing, the CPU starts processing from step 800 in FIG. 8 and executes steps 810 to 870 in the order of, for example, the left rear wheel and the right rear wheel, and then proceeds to step 880 to temporarily end this routine.

As can be seen from the comparison between FIGS. 8 and 7, step 810 is executed in the same manner as in step 710, and in step 820, the CPU specifies the predicted rear wheel passage positions in the same manner as in step 720. In step 830, in the same manner as in step 730, the CPU acquires information on the unsprung displacements z1crl and z1crr of the predicted rear wheel passage positions from the unsprung displacements in the preparation section acquired in advance from the preview reference data 45 in the cloud 40.

In step 840, the CPU acquires the unsprung displacements z1srl and z1srr of the predicted rear wheel passage positions from the unsprung displacements z1srl and z1srr stored in step 950 described later. In step 850, the CPU calculates the unsprung velocities dz1srl and dz1srr by time-differentiating the unsprung displacements z1srl and z1srr, respectively.

In step 860, the CPU calculates target control forces Fclrt and Fclrt of the active actuators 17RL and 17RR of the left and right rear wheels according to the following equations (13) and (14) corresponding to the above equation (10) based on the unsprung velocities dz1srl and dz1srr and the unsprung displacements z1crl and z1crr, respectively.

$$Fcllt = \beta 1r \times dz1srl + \beta 2r \times z1crl \tag{13}$$

$$Fcrrt = \beta 1r \times dz1srr + \beta 2r \times z1crr \tag{14}$$

In step 870, the CPU transmits control commands including the target control forces Fclrt and Fclrt to the active actuators 17RL and 17RR of the left and right rear wheels, respectively.

Figure 9:
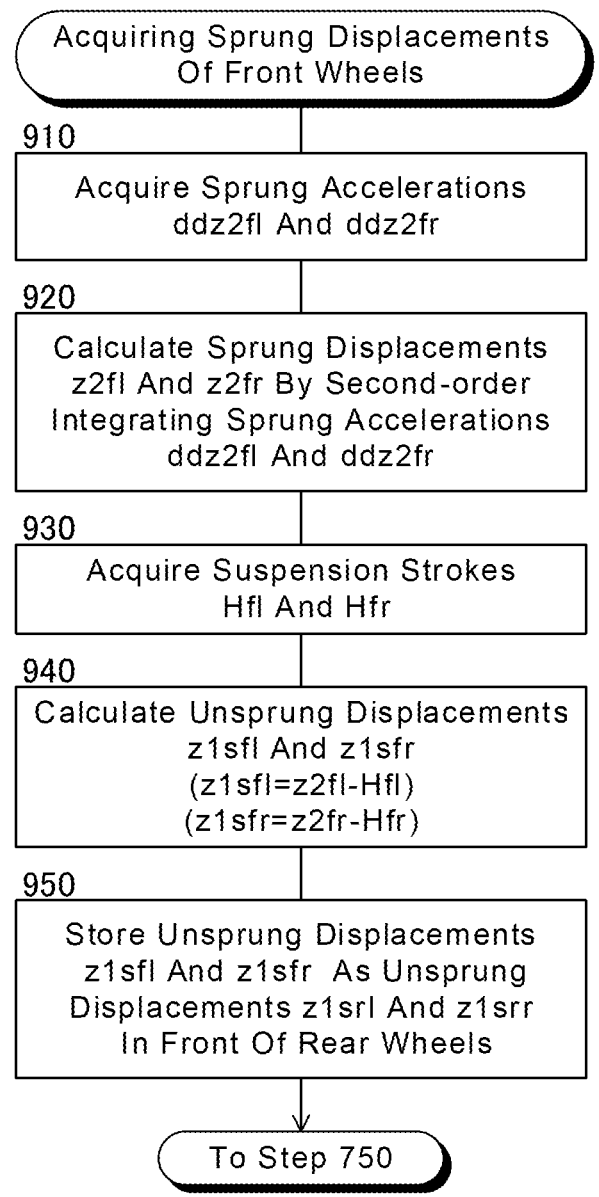
FIG. 9 is a flowchart showing a subroutine executed in step 740 shown in FIG. 7.

In step 910 of the unsprung displacement acquisition routine of the front wheel shown in FIG. 9, the CPU acquires sprung accelerations ddz2fl and ddz2fr from the vertical acceleration sensors 31FL and 31FR, respectively.

Step 920: The CPU calculates sprung displacements z2fl and z2fr by second-order integrating the sprung accelerations ddz2fl and ddz2fr, respectively, acquired in step 910.

Step 930: The CPU acquires suspension strokes Hfl and Hfr from the stroke sensors 32FL and 32FR, respectively.

Step 940: The CPU calculates unsprung displacements z1sfl and z1sfr at the positions of the left and right front wheels by subtracting the suspension strokes Hfl and Hfr from the sprung displacements z2fl and z2fr, respectively. That is, the CPU calculates the unsprung displacements z1sfl and z1sfr at the positions of the left and right front wheels according to the following equations (15) and (16), respectively.

$$z1sfl = z2fl - Hfl \tag{15}$$

$$Z1sfr = z2fr - Hfr \tag{16}$$

Step 950: The CPU associates the unsprung displacements z1sfl and z1sfr with the information on the positions of the left and right front wheels when the sprung accelerations ddz2fl and ddz2fr are detected, respectively, and stores the associated unsprung displacements in the storage device 30a as the unsprung displacements z1srl and z1srr in front of the left and right rear wheels.

As can be seen from the above, in the first embodiment, the ECU 30 of the damping control apparatus 20 calculates the unsprung displacement z1sfl and z1sfr of the front wheel positions based on the sprung accelerations ddz2fl and ddz2fr, and calculates the unsprung velocities dz1sfl and dz1sfr as their time derivative values. Further, the ECU 30 performs preview damping control based on the sum of the first control component proportional to the unsprung displacement z1ci acquired from the cloud 40 and the second control component proportional to the unsprung velocity dz1si based on the sprung acceleration or the like.

The unsprung displacement z1ci acquired from the cloud 40 is the first road surface displacement-related value and is a foreseeable road surface displacement-related value. The unsprung velocity dz1si based on the sprung acceleration and the suspension stroke is the second road surface displacement-related value, and is the road surface displacement-related value with less risk of misalignment of positions and higher accuracy than the time derivative value of the unsprung displacement z1ci acquired from the cloud 40.

In the first embodiment, when a preview sensor described later is provided, a vehicle speed V1 of the vehicle 10 is very high, and the rear wheel foresee distance Lpr is larger than the wheelbase L of the vehicle, an unsprung velocity acquired based on the detection result of the preview sensor may be used as the unsprung velocity dz1s of the left and right rear wheels.

Second Embodiment

Figure 10:
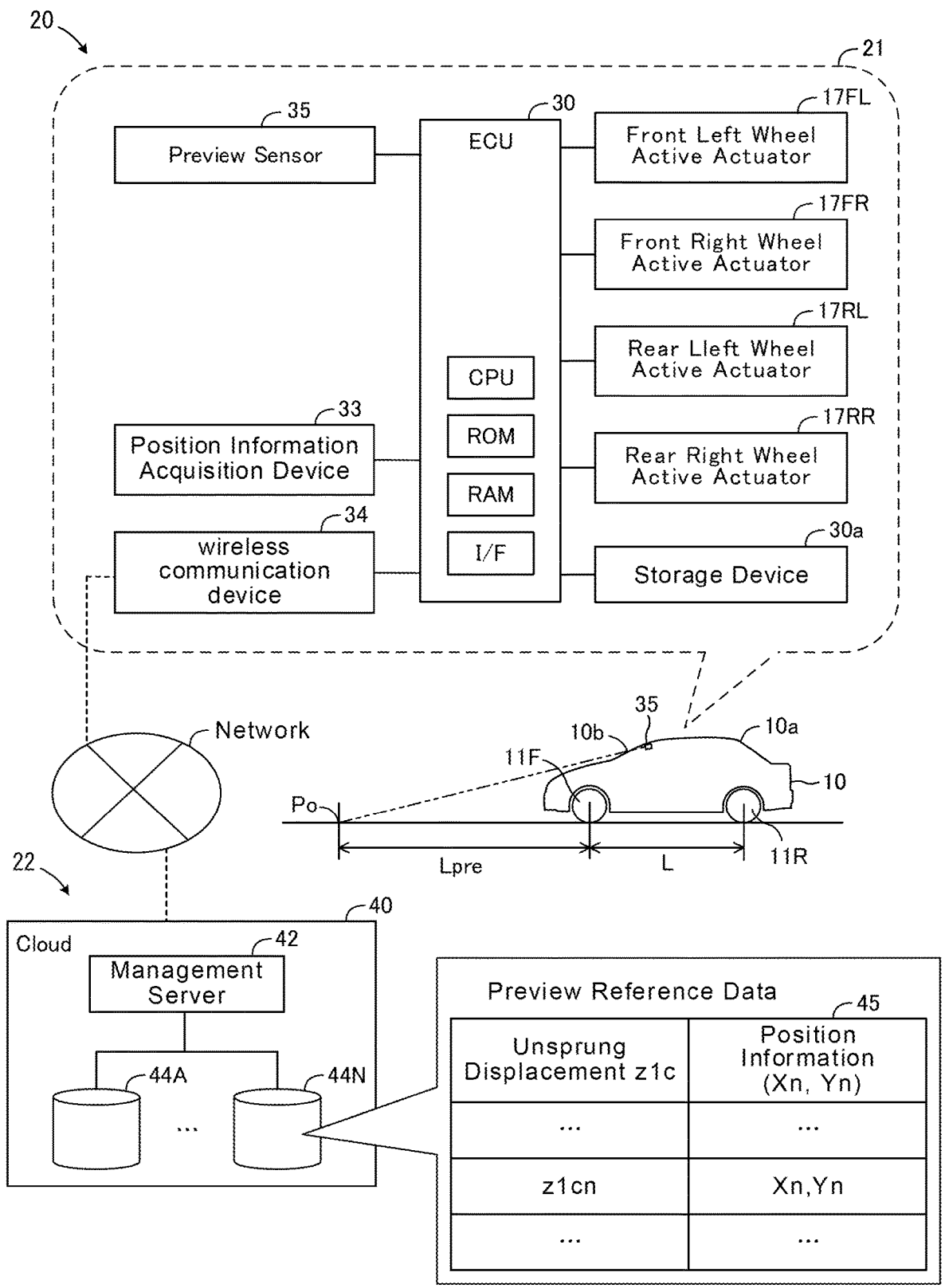
FIG. 10 is a schematic configuration diagram of a damping control apparatus according to the second embodiment of the present disclosure.

In the damping control apparatus 20 according to the second embodiment shown in FIG. 10, the on-board device 21 is provided with a preview sensor 35 in place of the vertical acceleration sensors 31FR and 31FR and the stroke sensors 32FR and 32FR on the sprung. The preview sensor 35 is also connected to the ECU 30. The damping control apparatus 20 is configured in the same manner as the damping control apparatus 20 according to the first embodiment in other respects.

The preview sensor 35 may be any preview sensor known in the art, such as a camera sensor, LIDAR, and radar, as long as it can acquire a value (referred to as "road surface displacement") representing a vertical displacement of a road surface in front of the vehicle 10. The ECU 30 functions as a road surface displacement-related information acquisition device that cooperates with the preview sensor 35, which is an on-board sensor, to acquire road surface displacement-related information in front of each wheel based on the detection result of the preview sensor.

As shown in FIG. 10, the preview sensor 35 is attached to, for example, an inner surface of an upper end portion of a windshield 10$b$ of the vehicle 10 at the center in the vehicle width direction, and detects a road surface displacement z0 at a target position Po and around it spaced by a preview distance Lpre in front of the front wheel 11F. In some embodiments, the preview distance Lpre is larger than a front wheel foresee distance Lpf (described later) when the vehicle speed of the vehicle 10 is a rated maximum vehicle speed. Further, although only one preview sensor 35 is shown in FIG. 10, a pair of preview sensors corresponding to the left and right front wheels may be provided.

(Preview Damping Control Routine of the Second Embodiment)

Figure 11:
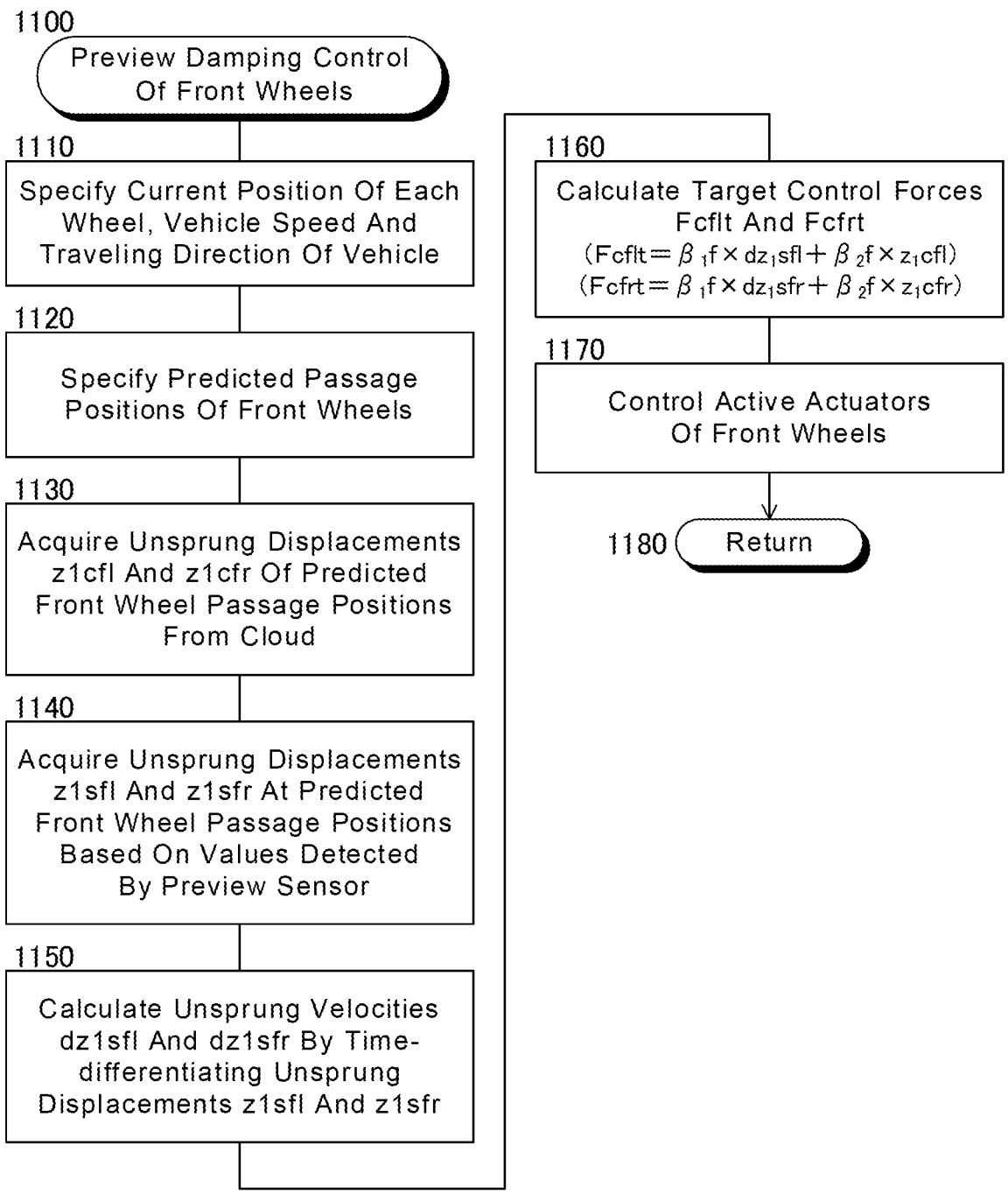
FIG. 11 is a flowchart showing a preview damping control routine for front wheels in the second embodiment.

The preview damping control corresponding to the left front wheel 11FL and the right front wheel 11FR is executed by the ECU 30 at predetermined time intervals according to the preview damping control routine shown in the flowchart of FIG. 11 as in the first embodiment. On the other hand, the preview damping control corresponding to the left rear wheel 11RL and the right rear wheel 11RR is executed at predetermined time intervals according to the preview damping control routine shown in the flowchart of FIG. 12. The preview damping control may be repeatedly executed, for example, in the order of the left front wheel, the right front wheel, the left rear wheel, and the right rear wheel.

<Preview Damping Control of Front Wheels 11FL and 11FR>

At a predetermined timing, the CPU of the ECU 30 starts processing from step 1100 in FIG. 11 in the order of, for example, the left front wheel and the right front wheel, executes steps 1110 to 1170, and then proceeds to step 1180 to temporarily finish executing this routine.

As can be seen from the comparison between FIGS. 11 and 7, the CPU executes steps 1110 to 1130 in the same manner as steps 710 to 730 in the first embodiment, respectively. Further, the CPU executes steps 1150 to 1170 in the same manner as steps 750 to 770 of the first embodiment, respectively. Therefore, detailed description of steps 1110 to 1130 and 1150 to 1170 will be omitted.

In step 1140, the CPU acquires unsprung displacements z1sfl and z1sfr at predicted passage positions of the left and right front wheels based on a road surface displacement in front of the vehicle detected by the preview sensor 35. In this connection, road surface displacements z0sfl and z0sfr at predicted passage positions of the front wheels detected by the preview sensor 35 may be acquired as unsprung displacements z1sfl and z1sfr. Further, road surface displacements in front of the vehicle detected by the preview sensor 35 may temporarily be stored in the RAM, and road surface displacements z0sfl and z0sfr at predicted passage positions of the front wheels may be specified based on the stored road surface displacements and may be acquired as the unsprung displacements z1sfl and z1sfr, respectively.

<Preview Damping Control of Rear Wheels 11RL and 11RR>

Figure 12:
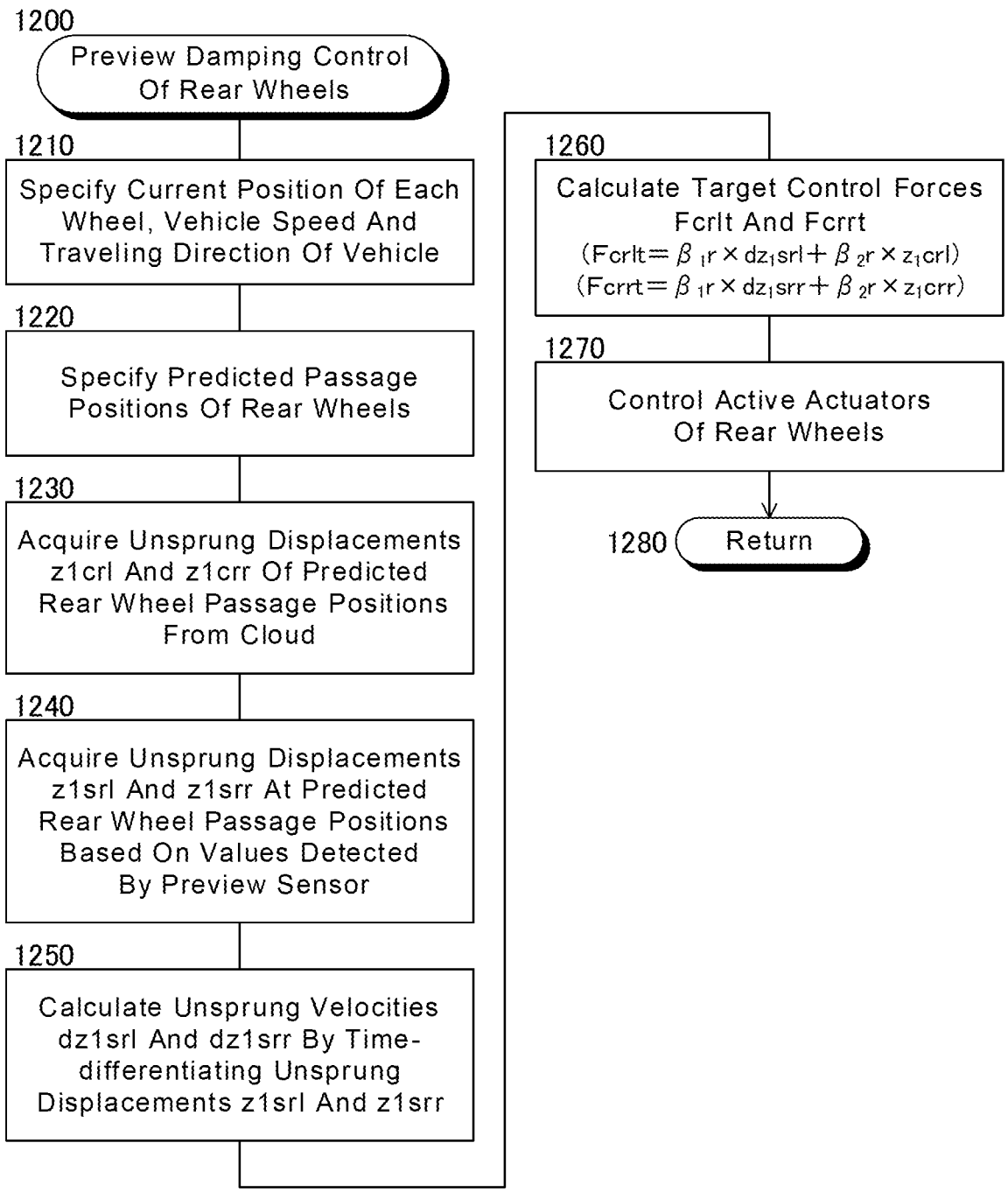
FIG. 12 is a flowchart showing a preview damping control routine for rear wheels in the second embodiment.

At a predetermined timing, the CPU of the ECU 30 starts processing from step 1200 in FIG. 12, for example, in the order of the left rear wheel and the right rear wheel, executes steps 1210 to 1270, and then proceeds to step 1280 to temporarily finish executing this routine.

As can be seen from the comparison between FIGS. 12 and 8, the CPU executes steps 1210 to 1230 in the same manner as steps 810 to 830 of the first embodiment, respectively. Further, the CPU executes steps 1250 to 1270 in the same manner as steps 850 to 870 in the first embodiment, respectively. Therefore, detailed description of steps 1210 to 1230 and 1250 to 1270 will be omitted.

In step 1240, the CPU acquires unsprung displacements z1srl and z1srr at predicted passage positions of the left and right rear wheels based on road surface displacements in front of the vehicle detected by the preview sensor 35 in the same manner as in step 1140. In this connection, road surface displacements z0srl and z0srr at predicted passage positions of the rear wheels detected by the preview sensor 35 may be acquired as unsprung displacements z1srl and z1srr. Further, road surface displacements in front of the vehicle detected by the preview sensor 35 may temporarily be stored in the RAM, and road surface displacements z0srl and z0srr at predicted passage positions of the rear wheels may be specified based on the stored road surface displacements and may be acquired as the unsprung displacements z1srl and z1srr, respectively.

As can be understood from the above, in the second embodiment, the ECU 30 of the damping control apparatus 20 acquires road surface displacement-related information in front of the left and right front wheels and left and right rear wheels based on the detection result of the preview sensor 35, which is an on-board sensor, and acquires unsprung displacements z1si at predicted passage positions of the wheels based on the road surface displacement-related information.

Further, the ECU 30 performs preview damping control based on the sum of the first control component proportional to the unsprung displacement z1ci acquired from the cloud 40 and the second control component proportional to the unsprung velocity dz1si based on the detection result of the preview sensor.

Further, the ECU 30 calculates unsprung velocity dz1s as the time derivative value of the unsprung displacement z1s, and executes the preview damping control based on the sum of the first control component proportional to the unsprung displacement z1c acquired from the cloud 40 and the second control component proportional to the unsprung velocity dz1s.

As described above, the unsprung displacement z1ci acquired from the cloud 40 is the first road surface displacement-related value and is the road surface displacement-related value that can be foreseen. The unsprung velocity dz1si based on the detection result of the preview sensor is the second road surface displacement-related value, and is the road surface displacement-related value with less risk of misalignment of positions and higher accuracy than the time derivative value of the unsprung displacements z1ci acquired from the cloud 40.

Third Embodiment

Figure 13:
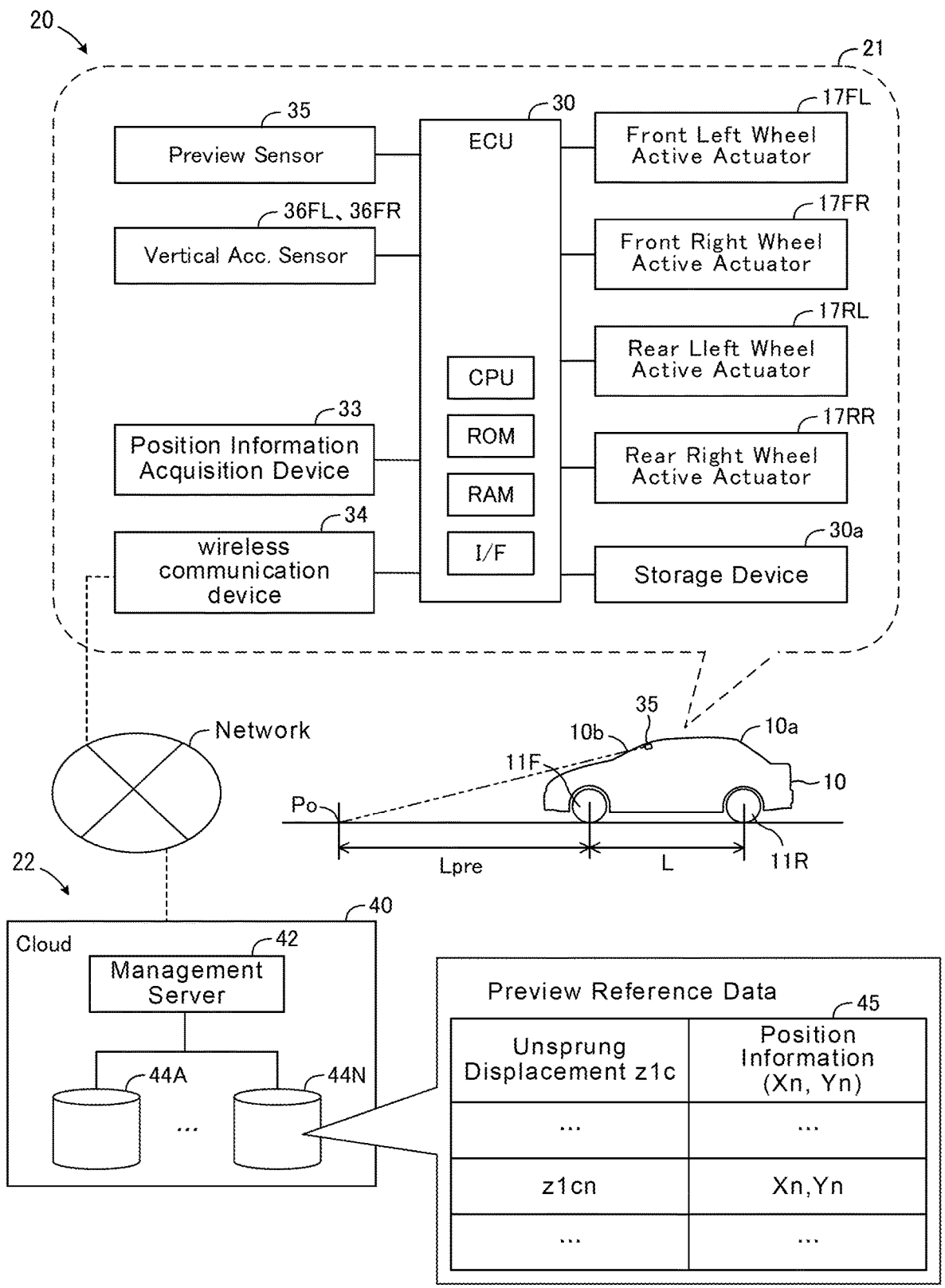
FIG. 13 is a schematic configuration diagram of a damping control apparatus according to the third embodiment of the present disclosure.

In the damping control apparatus 20 according to the third embodiment shown in FIG. 13, the on-board device 21 is provided with unsprung vertical acceleration sensors 36FL and 36FR in addition to the constituent members of the second embodiment. These sensors are also connected to the ECU 30. The damping control apparatus 20 is configured in the same manner as the damping control apparatus 20 according to the second embodiment, except that the above sensors are added to the on-board device 21.

The unsprung vertical acceleration sensors 36FL and 36FR are provided on the unsprung 50 of the left front wheel 11FL and the right front wheel 11FR, respectively. The vertical acceleration sensors 36FL and 36FR detect vertical accelerations of the unsprung 50 (unsprung accelerations ddz1fl and ddz1fr, respectively), and output signals representing the vertical accelerations to the ECU 30. The vertical acceleration sensors 36FL and 36FR are referred to as vertical acceleration sensor 36 when it is not necessary to distinguish between them. Similarly, the unsprung accelerations ddz1fl and ddz1fr are referred to as the unsprung acceleration ddz1.

(Preview Damping Control Routine of the Third Embodiment)

Figure 14:
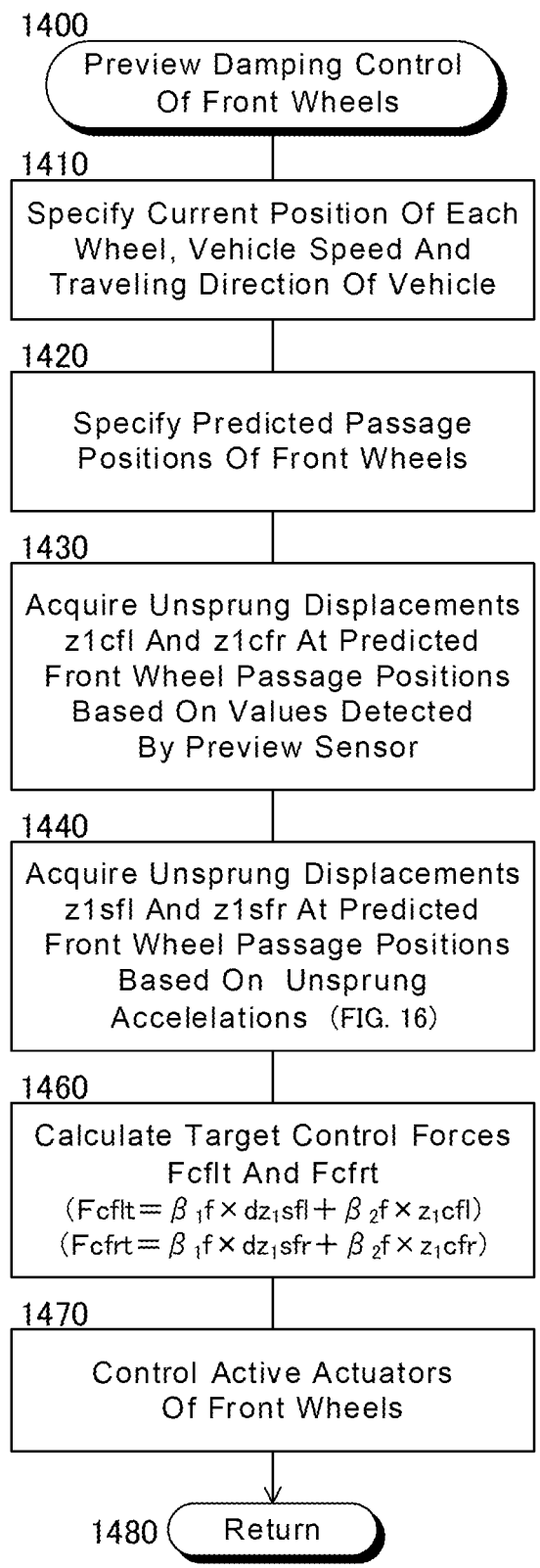
FIG. 14 is a flowchart showing a preview damping control routine for front wheels in the third embodiment.

The preview damping control corresponding to the left front wheel 11FL and the right front wheel 11FR is executed by the ECU 30 at predetermined time intervals according to the preview damping control routine shown in the flowchart of FIG. 14. On the other hand, the preview damping control corresponding to the left rear wheel 11RL and the right rear wheel 11RR is executed at predetermined time intervals according to the preview damping control routine shown in the flowchart of FIG. 15. The preview damping control may be repeatedly executed, for example, in the order of the left front wheel, the right front wheel, the left rear wheel, and the right rear wheel.

<Preview Damping Control of Front Wheels 11FL and 11FR>

At a predetermined timing, the CPU of the ECU 30 starts processing from step 1400 in FIG. 14 and executes steps 1410 to 1470 in the order of, for example, the left front wheel and the right front wheel, and then proceeds to step 1480 to temporarily finish executing this routine. In particular, the CPU calculates and acquire unsprung velocities dz1sfl and dz1sfr at the predicted passage positions of the left and right front wheels based on unsprung accelerations ddz1fl and ddz1fr, respectively, according to the subroutine shown in the flowchart of FIG. 16.

As can be seen from the comparison between FIGS. 14 and 7, the CPU executes steps 1410 and 1420 in the same manner as steps 710 and 720 in the first embodiment, respectively. Further, the CPU executes steps 1460 and 1470 in the same manner as steps 760 and 770 in the first embodiment, respectively. Therefore, detailed description of steps 1410, 1420, 1460 and 1470 will be omitted.

In step 1430, as in step 1140 in the second embodiment, the CPU acquires the unsprung displacements z1cfl and z1cfr at predicted passage positions of the left and right front wheels based on road surface displacements in front of the vehicle detected by the preview sensor 35. In this connection, road surface displacements z0sfl and z0sfr at predicted passage positions of the front wheels detected by the preview sensor 35 may be acquired as the unsprung displacements z1cfl and z1cfr. Further, the road surface displacements in front of the vehicle detected by the preview sensor 35 may be temporarily stored in the RAM, and road surface displacements z0sfl and z0sfr at predicted passage positions of the front wheels may be specified based on the stored road surface displacements, and may be acquired as unsprung displacements z1cfl and z1cfr.

Figure 16:
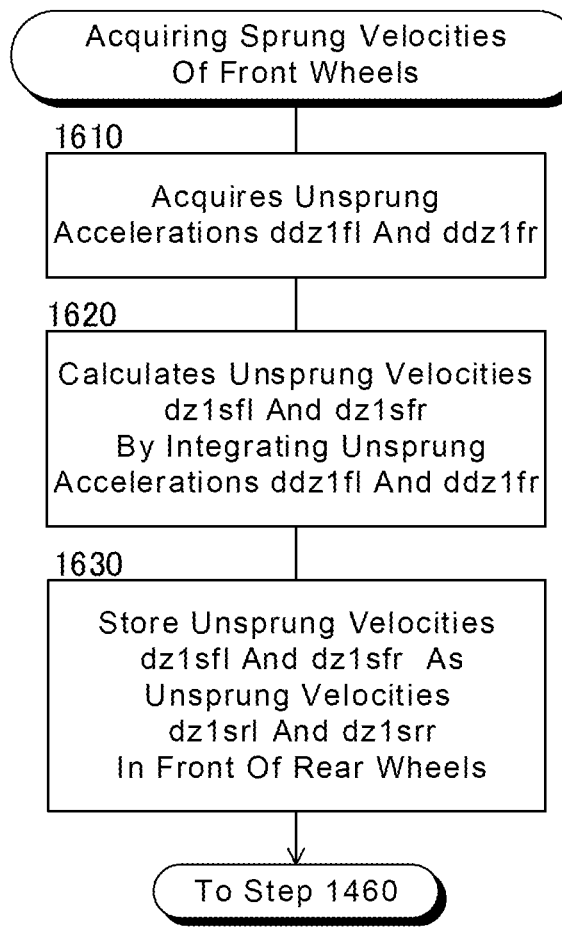
FIG. 16 is a flowchart showing a subroutine executed in step 1440 shown in FIG. 14.

In step 1440, the CPU calculates the unsprung velocities dz1sfl and dz1sfr at predicted passage positions of the front wheels based on the unsprung accelerations ddz1fl and ddz1fr by executing steps 1610 to 1630 of FIG. 16, and proceeds to step 1460 when step 1630 is completed.

<Preview Damping Control of Rear Wheels 11RL and 11RR>

Figure 15:
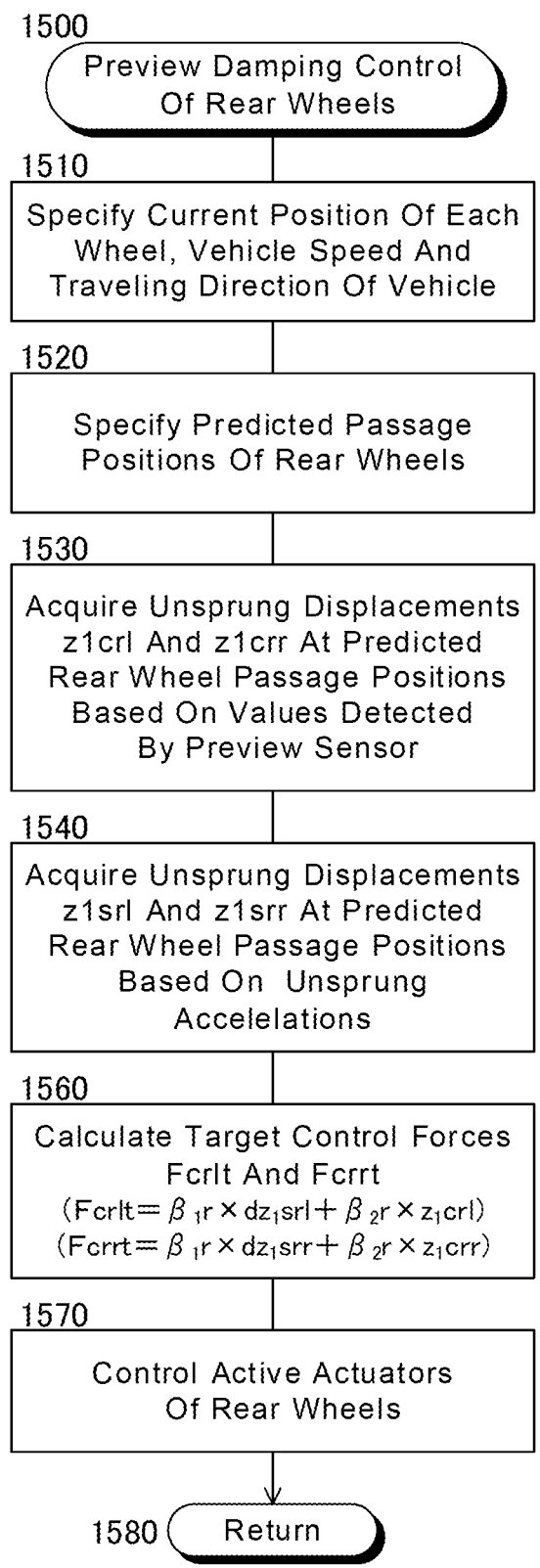
FIG. 15 is a flowchart showing a preview damping control routine for rear wheels in the third embodiment.

At a predetermined timing, the CPU of the ECU 30 starts processing from step 1500 in FIG. 15 in the order of, for example, the left rear wheel and the right rear wheel, executes steps 1510 to 1570, and then proceeds to step 1580 to temporarily finish executing this routine.

As can be seen from the comparison between FIGS. 15 and 8, the CPU executes steps 1510 and 1520 in the same manner as steps 810 and 820 of the first embodiment, respectively. Further, the CPU executes steps 1560 and 1570 in the same manner as steps 860 and 870 in the first embodiment, respectively. Therefore, detailed description of steps 1510, 1520, 1560 and 1570 will be omitted.

In step 1530, the CPU acquires the unsprung displacements z1crl and z1crr at predicted passage positions of the left and right rear wheels based on road surface displacements in front of the vehicle detected by the preview sensor 35 in the same manner as in step 1430. In this connection, road surface displacements z0srl and z0srr at predicted passage positions of the rear wheels detected by the preview sensor 35 may be acquired as the unsprung displacements z1crl and z1crr. Further, the road surface displacements in front of the vehicle detected by the preview sensor 35 are temporarily stored in the RAM, and road surface displacements z0srl and z0srr at predicted passage positions of the rear wheels may be specified based on the stored road surface displacements and may be acquired as the unsprung displacements z1crl and z1crr.

In step 1540, the CPU acquires the unsprung velocities dz1srl and dz1srr at predicted passage positions of the rear wheels from the unsprung velocities dz1srl and dz1srr stored in step 1630 described later.

In step 1610 of the unsprung velocity acquisition routine of the front wheels shown in FIG. 16, the CPU acquires the unsprung accelerations ddz1fl and ddz1fr from the vertical acceleration sensors 36FL and 36FR, respectively.

In step 1620, the CPU calculates unsprung velocities dz1sfl and dz1sfr by integrating the unsprung accelerations ddz1fl and ddz1fr acquired in step 1610, respectively.

In step 1630, the CPU associates the unsprung velocities dz1sfl and dz1sfr with the information on the position of the front wheels when the unsprung accelerations ddz1fl and ddz1fr are detected, respectively, and stores them in the storage device 30a as unsprung velocities dz1srl and dz1srr in front of the rear wheels.

As can be understood from the above, in the third embodiment, the ECU 30 of the damping control apparatus 20 acquires unsprung velocities dz1sfl and dz1sfr, which are time derivative values of the second road surface displacement-related values at the positions of the left and right front wheels, respectively, based on the unsprung accelerations ddz1fl and ddz1fr detected by the unsprung vertical acceleration sensors 36FL and 36FR, which are on-board sensors.

Further, the ECU 30 executes the preview damping control based on a sum of the first control component proportional to the unsprung displacement z1ci and the second control component proportional to the unsprung velocity dz1si based on the detection result of the preview sensor.

The unsprung displacement z1ci based on the detection result of the preview sensor is the first road surface displacement-related value and is the road surface displacement-related value that can be foreseen. The unsprung velocity $dz1si$ based on the unsprung acceleration is the time derivative value of the second road surface displacement-related value, and is the road surface displacement-related value with less risk of misalignment of positions and higher accuracy than the time derivative value of the unsprung displacement $z1ci$ based on the detection result of the preview sensor.

[First Modification]

The first modification is a modification corresponding to the above-mentioned first embodiment. In the first modification, although not shown, the vertical acceleration sensors 31FL, 31FR and stroke sensors 32FL, 32FR on the sprung in the first embodiment are replaced with the vertical acceleration sensors 36FL, 36FR on the unsprung.

Therefore, in the first modification, the unsprung velocities $dz1sfl$ and $dz1sfr$ at predicted passage positions of the front wheels and the unsprung velocities $dz1srl$ and $dz1srr$ at predicted passage positions of the rear wheels are calculated based on the unsprung accelerations $ddz1fl$ and $ddz1fr$ detected by the vertical acceleration sensors 36FL and 36FR, respectively. The unsprung velocities at predicted passage positions of the front wheels and at predicted passage positions of the rear wheels are more accurate than the time derivative value $dz1c$ of the unsprung displacement $z1c$ acquired from the cloud 40, which may cause misalignment of positions.

[Second Modification]

Figure 17:
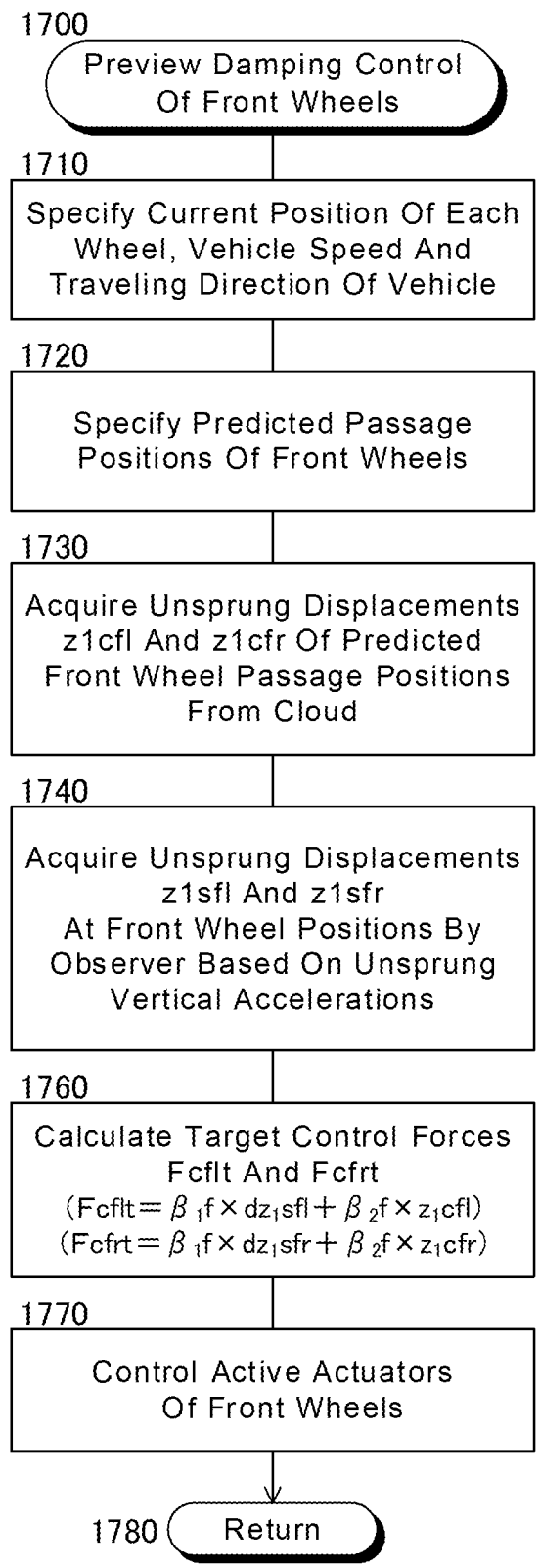
FIG. 17 is a flowchart showing a preview damping control routine for front wheels in the second modification.

FIG. 17 shows the damping control routine of the front wheels in the second modification configured as the modification of the first embodiment. Although not shown in the figures, vertical acceleration sensors on the unsprung are provided in place of the vertical acceleration sensors on the sprung and the stroke sensors in the first embodiment. Further, the damping control of the rear wheels is executed in the same manner as the damping control of the rear wheels in the third embodiment.

As can be seen from the comparison between FIGS. 17 and 7, steps 1710 to 1730 are performed in the same manner as steps 710 to 730, respectively, and steps 1760 and 1770 are performed in the same manner as in steps 760 and 770, respectively.

In step 1740, the CPU acquires unsprung velocities $dz1sfl$ and $dz1sfr$ using an observer based on the unsprung vertical accelerations $ddz1fl$ and $ddz1fr$ detected by the unsprung vertical acceleration sensors.

Therefore, according to the second modification, the unsprung velocities $dz1sfl$ and $dz1sfr$ are acquired based on the unsprung vertical accelerations $ddz1fl$ and $ddz1fr$, respectively, detected by the unsprung vertical acceleration sensors as in the third embodiment. Further, the damping control is performed in the same manner as in the third embodiment except for the acquisition of the unsprung velocities, so that the damping control of the front wheel positions and the rear wheel positions can be performed in the same manner as in the third embodiment.

It is to be noted that the unsprung velocity may be acquired by using an observer based on the sprung vertical acceleration $ddz2$ detected by the sprung vertical acceleration sensor or the stroke H which is the relative displacement between the sprung and the unsprung detected by the stroke sensor. An unsprung velocity may be obtained using an observer based on any two or three combinations of the sprung vertical acceleration $ddz2$, the stroke H and the unsprung vertical acceleration $ddz1$. Further, the observer may be any observer known in the art and may be stored in the ROM of the ECU 30.

[Third Modification]

The third modification is a modification corresponding to the third embodiment described above. In the third modification, although not shown in the figures, sprung vertical acceleration sensors and stroke sensors are provided in place of the unsprung vertical acceleration sensors in the third embodiment.

Further, although not shown in the figures, the damping control of the front wheels is performed in the same manner as the damping control of the front wheels in the third embodiment, and the damping control of the rear wheels is executed in the same manner as the damping control of the rear wheels in the first embodiment.

[Fourth Modification]

The fourth modification is also a modification corresponding to the third embodiment described above. In the fourth modification, although not shown in the figures, the damping control of the front wheels is executed in the same manner as the damping control of the front wheels in the third embodiment except for step 1440, and the damping control of the rear wheels is executed in the same manner as the damping control of the rear wheels in the third embodiment.

In step 1440, as in the second modification, the CPU acquires the unsprung velocities $dz1sfl$ and $dz1sfr$ using an observer based on the unsprung vertical accelerations $ddz1fl$ and $ddz1fr$ detected by the unsprung vertical acceleration sensors.

Therefore, according to the fourth modification, the unsprung velocities $dz1sfl$ and $dz1sfr$ are acquired based on the unsprung vertical accelerations $ddz1fl$ and $ddz1fr$, respectively, detected by the unsprung vertical acceleration sensors as in the third embodiment. Further, the damping control is performed in the same manner as in the third embodiment except for the acquisition of the unsprung velocities, so that it is possible to perform the damping control of the front wheel positions and the rear wheel positions.

Each unsprung velocity may be acquired by using an observer based on the sprung vertical acceleration $ddz2$ detected by the sprung vertical acceleration sensor or the stroke H which is the relative displacement between the sprung and the unsprung detected by the stroke sensor. Each unsprung velocity may be acquired using an observer based on a combination of two or three of the unsprung vertical acceleration $ddz2$, the stroke H and the unsprung vertical acceleration $ddz1$. Further, the observer may be any observer known in the art and may be stored in the ROM of the ECU 30.

(Transmission of Unsprung Displacement to Cloud 40)

As described above, in the first and third embodiments and the first and third modifications, the unsprung velocity $dz1s$ at the position of the front wheel is acquired based on a vertical motion state quantity of the vehicle 10 such as the sprung acceleration $ddz2$, and is stored in the storage device 30a in association with the information on the position of the front wheel. Therefore, the damping control apparatus 20 may be configured to store a preset number of the unsprung displacements $z1s$ by integrating the unsprung velocity $dz1s$, and, when the preset transmission condition is satisfied, transmit the unsprung displacement $z1s$ and the position information to the cloud 40 via the wireless communication device 34 and the network.

The management server 42 of the cloud 40 may be configured to store the unsprung displacement $z1s$ and position information transmitted from the vehicle 10 and other vehicles as the unsprung displacement $z1cn$ and position (Xn, Yn) information (n=1, 2 . . . N (N is a positive integer)) in the cloud for each vehicle. Further, the management server 42 may be configured to update the unsprung displacement z1c to the latest information for each position (Xn, Yn) when a preset transmission condition is satisfied.

The latest unsprung displacement z1c information stored in the storage device 44n in the cloud 40 is an unsprung displacement acquired based on a vertical motion state quantity such as sprung vertical acceleration when the vehicle 10 and other vehicles actually travel. Therefore, the unsprung displacement z1c in the cloud 40 is more accurate than an unsprung displacement based on a value representing the vertical displacement of a road surface in front of the vehicle acquired by the preview sensor 35.

In the first and third embodiments and the first to fourth modifications, sensors for detecting vertical motion state quantities of the vehicle 10 such as the sprung vertical acceleration sensors 31FL, 31FR are only provided for the left and right front wheels. However, sensors for detecting motion state quantities may also be provided for the left and right rear wheels, and the unsprung displacement z1s acquired by integrating the unsprung velocity dz1s acquired for the positions of the left and right rear wheels and information on the positions may also be transmitted to the cloud 40.

Further, in the second embodiment, a sensor for detecting a vertical motion state quantity of the vehicle 10 such as the sprung vertical acceleration sensors 31FL, 31FR is not provided. However, also in the second embodiment, sensors for detecting motion state quantities may be provided, and unsprung displacements z1s acquired by integrating the unsprung velocities dz1s acquired for the positions of the left and right front wheels and/or the rear wheels and the information on positions may be transmitted to the cloud 40.

Effects of Embodiments and Modifications

As can be seen from the above description, according to the first to third embodiments and the first to fourth modifications described above, a target control force Fct is calculated based on a sum of the first control component based on the first road surface displacement-related value and the second control component based on the time derivative value of the second road surface displacement-related value.

As described above, the first road surface displacement-related value is a road surface displacement-related value that can be foreseen, and the second road surface displacement-related value is a road surface displacement-related value with higher accuracy than the first road surface displacement-related value. Therefore, the first control component can be calculated based on the pre-readable first road surface displacement-related value to reduce the sprung vibration without delay in control, and the second control component that enables damping control with high accuracy compared to where the second control component is calculated based on the first road surface displacement-related value can be calculated. In other words, a target control force Fct can be calculated based on a combination of two unsprung displacement-related values that take advantage of the unsprung displacement-related value acquired by the preview sensor, the unsprung displacement-related value based on the motion state quantity, and the unsprung displacement-related value based on the unsprung displacement-related information stored in the storage device.

Therefore, according to the first to third embodiments and the first to fourth modifications described above, a target control force is calculated based on a sum of the first and second control components, and it is possible to damp the sprung vibration more accurately compared with the conventional damping control in which the first and second control components are calculated based on the same road surface displacement-related value.

In particular, according to the second embodiment, it is possible to damp the sprung vibration more accurately than in the past without requiring a sensor such as a sprung vertical acceleration sensors 31FL, 31FR that detects a vertical motion state quantity of the vehicle 10. According to the third embodiment and the third and fourth modifications, it is possible to damp the sprung vibration more accurately than in the past without requiring information from the cloud 40.

Further, the unsprung displacement z1s and its time derivative value acquired based on a detection result of a sensor that detects a motion state quantity of the vehicle 10 in the vertical direction such as the sprung vertical acceleration sensors 31FL, 31FR are more accurate than the unsprung displacement z1s and its time derivative value acquired based on the detection results of the preview sensor 35. Therefore, according to the first embodiment and the first and second modifications described above, it is possible to damp the sprung vibration with higher accuracy than in the second embodiment.

Although the present disclosure has been described in detail with reference to specific embodiments, it will be apparent to those skilled in the art that the present disclosure is not limited to the above-described embodiments, and various other embodiments are possible within the scope of the present disclosure.

For example, in each of the above-described embodiments, the preview reference data 45 does not have to be stored in the storage device 44 of the cloud 40, and may be stored in the storage device 30a. In the second and third embodiments, the CPU may store collected data in the storage device 30a as it is, and does not need to transmit the collected data to the cloud 40.

Further, when a travel route of the vehicle 10 is predetermined, the CPU may download the preview reference data 45 of the travel route from the cloud 40 in advance before the vehicle 10 starts traveling on the travel route, and may store the preview reference data in the storage device 30a.

In the preview reference data 45, the unsprung velocity dz1ci may be stored in association with the position information and the vehicle speed information instead of the unsprung displacement z1. In that case, in step 750 shown in FIG. 7, for example, the CPU acquires the unsprung velocity dz1ci and calculates the unsprung displacement z1ci by integrating the acquired unsprung velocity dz1ci.

The vertical acceleration sensor 31 may be provided corresponding to at least three wheels. The sprung acceleration corresponding to the wheel not provided with the vertical acceleration sensor 31 can be estimated based on the sprung accelerations detected by the three vertical acceleration sensors 31.

The calculation process of the target control force Fct of the rear wheel 11R in the first embodiment is not limited to the above example. For example, the CPU may calculate the target control force Fct based on the unsprung displacement z1 of the present position of the front wheel 11F at the present time tp, and may transmit a control command including the target control force Fct to the rear wheel active actuator 17R at a timing delayed by a time (L/V−tpr) from the present time tp. That is, the CPU may transmit a control command including the target control force Fcrt to the rear wheel active actuator 17R at a timing when the rear wheel 11R reaches a point ahead of the present position of the front wheel 11F by the rear wheel foresee distance Lpr.

Further, the CPU may identify a predicted movement course of the rear wheel 11R based on the present position of the rear wheel, the traveling direction Td of the vehicle 10 and the positional relationship data independently of a predicted movement course of the front wheel, and may specify a position spaced by the rear wheel foresee distance Lpr along the predicted rear wheel movement course as a predicted passage position of the rear wheel. Then, the CPU may acquire an unsprung displacement z1 at predicted passage position of the rear wheel, and may calculate a target control force Fct of the rear wheel 11R based on the acquired unsprung displacement z1.

A vehicle speed V1 and a traveling direction Td are acquired based on the present position of the vehicle 10 acquired by the GNSS receiver, but the acquisition of them are not limited to that manner. For example, the damping control apparatus 20 may include a wheel speed sensor and a steering angle sensor (not shown), the wheel speed sensor may detect a rotation speed of the wheel 11, and the CPU may determine a vehicle speed V1 based on the rotation speed of the wheel 11. A yaw rate sensor for detecting a yaw rate of the vehicle 10 may be provided, and the CPU may acquire a traveling direction Td based on the yaw rate and the vehicle speed V1.

The suspensions 13FL to 13RR may be any type of suspension as long as the wheels 11FL to 11RR and the vehicle body 10a are allowed to be displaced vertically with respect to each other. Further, the suspension springs 16FL to 16RR may be arbitrary springs such as compression coil springs and air springs.

In the above-described embodiments, the active actuators 17FL to 17RR are provided corresponding to the wheels 11, but at least one wheel 11 may be provided with an active actuator 17. For example, the vehicle 10 may include only one each of the front wheel active actuator 17F and the rear wheel active actuator 17R.

In the above-described embodiments and the above-described modifications, the active actuator 17 is used as the control force generating device, but the control force generating device is not limited to the active actuator. That is, the control force generating device may be an actuator capable of adjustably generating a vertical control force for damping the sprung 51 based on a control command including a target control force.

Further, the control force generating devices may be active stabilizer devices (not shown), that includes a front wheel active stabilizer device and a rear wheel active stabilizer device. The front wheel active stabilizer device is configured to generate a vertical control force (i.e., a front left wheel control force) in one of directions between the sprung 51 corresponding to the front left wheel 11FL and the unsprung 50 corresponding to the front left wheel 11FL and to generate a vertical control force (i.e., a front right wheel control force) in the other one of directions between the sprung 51 corresponding to the front right wheel 11FR and the unsprung 50 corresponding to the front right wheel 11FR. The rear wheel active stabilizer device is configured to generate a vertical control force (i.e., a rear left wheel control force) in one of directions between the sprung 51 corresponding to the rear left wheel 11RL and the unsprung 50 corresponding to the rear left wheel 11RL and to generate a vertical control force (i.e., a rear right wheel control force) in the other one of directions between the sprung 51 corresponding to the rear right wheel 11RR and the unsprung 50 corresponding to the rear right wheel 11RR. The thus configured active stabilizer device is well-known, and is disclosed in, for example, Japanese Patent Application Laid-Open No. 2009-96366 that is hereby incorporated by reference. It should be noted that the active stabilizer device may include only either the front wheel active stabilizer device or the rear wheel active stabilizer device.

The control force generating device may be a device configured to generate a vertical control force by increasing and decreasing a braking force or a driving force applied to the wheel 11 of the vehicle 10 with utilizing geometry of the suspension 13. This type of control force generating device is well-known, and is disclosed in, for example, Japanese Patent Application Laid-Open No. 2016-107778 that is hereby incorporated by reference. When this device is employed, the ECU 30 calculates the braking force or the driving force to generate a control force corresponding to a target control force that corresponds to a target actuator force.

In addition, this type of device may include a drive device (e.g., an in-wheel motor) for applying a driving force to the wheel 11 and a brake device for applying a braking force to the wheel 11. In this case, the drive device may be a motor and/or an engine that can apply driving forces to either one of or both of the front wheels and the rear wheels. Furthermore, the control force generating device may include at least one of the drive device and the brake device.

The shock absorbers 15FL to 15RR may be replaced with the variable damping force shock absorbers so as to be the control force generating devices. In this case, the ECU 30 controls a damping coefficient of each of the absorbers in such a manner that a damping force of the each of the absorbers varies depending on the target control force.

What is claimed is:

1. A damping control apparatus for a vehicle which comprises:
a control force generating device configured to generate a vertical control force for damping a sprung of the vehicle between at least one wheel and a vehicle body portion corresponding to a position of the wheel;
an electronic control unit configured to control the control force generating device; and
a road surface displacement-related information acquisition device configured to acquire road surface displacement-related information related to a vertical displacement of a road surface, wherein
the electronic control unit is configured to:
determine a predicted wheel passage position where a wheel is predicted to pass,
calculate a target control force for reducing a vibration of the sprung when the wheel passes through the predicted wheel passage position based on a sum of a first control component based on a first road surface displacement-related value and a second control component based on a time derivative value of a second road surface displacement-related value, and
control the control force generating device so that a control force generated by the control force generating device when the wheel passes through the predicted wheel passage position becomes the target control force,
the first and second road surface displacement-related values is a combination of two different road surface displacement-related values among a road surface displacement-related value acquired based on road surface displacement-related information stored in a storage device that stores road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit that calculates a road surface displacement-related value based on a vertical motion state quantity of the vehicle, and a road surface displacement-related value acquired by a preview sensor that acquires a road surface displacement-related value in front of the vehicle, the first road surface displacement-related value is a road surface displacement-related value that can be foreseen, and the second road surface displacement-related value has higher accuracy than the first road surface displacement-related value, and the road surface displacement-related information acquisition device includes at least two devices for acquiring the first and second road surface displacement-related values among the calculation unit, the storage device, and the preview sensor.

2. The damping force control apparatus for a vehicle according to claim 1, wherein the combination of the first and second road surface displacement-related values is one of:

a first combination of a first road surface displacement-related value acquired based on the road surface displacement-related information stored in the storage device and a second road surface displacement-related value calculated by the calculation unit, a second combination of a first road surface displacement-related value acquired based on the road surface displacement-related information stored in the storage device and a second road surface displacement-related value acquired by the preview sensor, a third combination of a first road surface displacement-related value acquired by the preview sensor and a second road surface displacement-related value calculated by the calculation unit.

3. The damping force control apparatus for a vehicle according to claim 1, wherein the electronic control unit is configured to acquire a sprung vertical acceleration at a position of a front wheel and a relative displacement between the sprung and an unsprung, and calculate a road surface displacement-related value at the position of the front wheel based on the sprung vertical acceleration and the relative displacement.

4. The damping force control apparatus for a vehicle according to claim 1, wherein the electronic control unit is configured to acquire a unsprung vertical acceleration at a position of a front wheel and calculate a road surface displacement-related value at the position of the front wheel based on the unsprung vertical acceleration.

5. The damping force control apparatus for a vehicle according to claim 1, wherein the electronic control unit is configured to acquire at least one value of a sprung vertical acceleration at a position of a front wheel, a relative displacement between the sprung and an unsprung at the position of the front wheel, and an unsprung vertical acceleration at the position of the front wheel, and calculate a road surface displacement-related value by an observer based on at least one of the three values.

6. The damping force control apparatus for a vehicle according to claim 1, wherein the storage device is a storage device provided outside the vehicle, and the electronic control unit is configured to acquire road surface displacement-related information of the predicted wheel passage position from the storage device via a wireless communication line.

7. The damping force control apparatus for a vehicle according to claim 1, wherein the road surface displacement-related information is at least one of an unsprung displacement representing a vertical displacement of the unsprung of the vehicle, an unsprung velocity which is a time derivative of the unsprung displacement, a road surface displacement representing a vertical displacement of a road surface, and a time derivative value of the road surface displacement.

8. The damping force control apparatus for a vehicle according to claim 1, wherein the road surface displacement-related value is one of a unsprung displacement representing a vertical displacement of an unsprung of the vehicle and a road surface displacement representing a vertical displacement of a road surface.

9. A damping control method for a vehicle which damps a sprung of the vehicle by controlling a control force generating device configured to generate a vertical control force for damping the sprung of the vehicle between at least one wheel and a vehicle body portion corresponding to a position of the wheel, wherein the method comprises:

a step of determining a predicted wheel passage position where the wheel is predicted to pass, a step of calculating a target control force for reducing a vibration of the sprung when the wheel passes through the predicted wheel passage position based on a sum of a first control component proportional to a first road surface displacement-related value and a second control component proportional to a time derivative value of a second road surface displacement-related value, and a step of controlling a control force generating device so that a control force generated by the control force generating device when the wheel passes through the predicted wheel passage position becomes the target control force, the first and second road surface displacement-related values is a combination of two different road surface displacement-related values among a road surface displacement-related value acquired based on road surface displacement-related information stored in a storage device that stores road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit that calculates a road surface displacement-related value based on a vertical motion state quantity of the vehicle, and a road surface displacement-related value acquired by a preview sensor that acquires a road surface displacement-related value in front of the vehicle, the first road surface displacement-related value is a road surface displacement-related value that can be foreseen, and the second road surface displacement-related value has higher accuracy than the first road surface displacement-related value.

* * * * *